(12) United States Patent
Brown et al.

(10) Patent No.: US 8,772,699 B2
(45) Date of Patent: Jul. 8, 2014

(54) DISPLAY DEVICE HAVING A PHOTOSENSOR

(75) Inventors: Christopher Brown, Oxford (GB); Kohei Tanaka, Osaka (JP); Hiromi Katoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 338 days.

(21) Appl. No.: 13/254,422

(22) PCT Filed: Jan. 7, 2010

(86) PCT No.: PCT/JP2010/050078
§ 371 (c)(1),
(2), (4) Date: Sep. 1, 2011

(87) PCT Pub. No.: WO2010/100958
PCT Pub. Date: Sep. 10, 2010

(65) Prior Publication Data
US 2011/0315860 A1    Dec. 29, 2011

(30) Foreign Application Priority Data
Mar. 2, 2009    (JP) ................................ 2009-048400

(51) Int. Cl.
*H03F 3/08*    (2006.01)
*G06F 3/038*    (2013.01)
(52) U.S. Cl.
USPC ...................................... 250/214 A; 345/207
(58) Field of Classification Search
USPC ...................................... 250/214 A; 345/207
See application file for complete search history.

(56) References Cited

U.S. PATENT DOCUMENTS

| | | | |
|---|---|---|---|
| 5,898,207 A * | 4/1999 | Takase et al. ................. | 257/368 |
| 7,423,790 B2 * | 9/2008 | Kochi et al. .................... | 358/513 |
| 2005/0045881 A1 | 3/2005 | Nakamura et al. | |
| 2009/0310007 A1 | 12/2009 | Matsui et al. | |
| 2011/0175871 A1 | 7/2011 | Katoh et al. | |

FOREIGN PATENT DOCUMENTS

| | | |
|---|---|---|
| JP | 2006-003857 A | 1/2006 |
| JP | 2008-205870 A | 9/2008 |
| WO | WO 2007/145346 A1 | 12/2007 |
| WO | WO 2007/145347 A1 | 12/2007 |
| WO | WO 2008096892 A1 * | 8/2008 |
| WO | WO 2008126872 A1 * | 10/2008 |
| WO | WO 2008/156024 A1 | 12/2008 |
| WO | WO 2009/025223 A1 | 2/2009 |

* cited by examiner

*Primary Examiner* — Thanh Luu
(74) *Attorney, Agent, or Firm* — Birch, Stewart, Kolasch & Birch, LLP

(57) ABSTRACT

The present invention relates to a display device including a photosensor in a pixel region. The photosensor of the present invention includes a diode (D1) that receives incident light, reset signal wiring (RST) that supplies a reset signal, readout signal wiring (RWS) that supplies a readout signal, a storage node (INT) whose potential changes in accordance with the amount of light received by the photodetection element in a sensing period, the sensing period being from when the reset signal is supplied until when the readout signal is supplied, an amplification element (C1) that amplifies the potential of the storage node in accordance with the readout signal, and a sensor switching element (M2) for reading out the potential amplified by the amplification element to output wiring (OUT) as sensor circuit output.

13 Claims, 51 Drawing Sheets

DISPLAY DEVICE HAVING A PHOTOSENSOR

TECHNICAL FIELD

The present invention relates to a display device with a photosensor that has a photodetection element such as a photodiode or a phototransistor, and in particular relates to a display device including a photosensor in a pixel region.

BACKGROUND ART

Conventionally, there has been proposed a display device with a photosensor that, by incorporating a photodetection element such as a photodiode inside a pixel, can detect the brightness of external light and pick up an image of an object that is located close to the display. Such a display device with a photosensor is envisioned to be used as a bidirectional communication display device or display device with a touch panel function.

In a conventional display device with a photosensor, when using a semiconductor process to form known constituent elements such as signal lines, scan lines, TFTs (Thin Film Transistors), and pixel electrodes on an active matrix substrate, photodiodes or the like are formed at the same time on the active matrix substrate (see PTL 1 and NPL 1).

FIG. 59 shows an example of a conventional photosensor (PTL 2 and 3) formed on an active matrix substrate. The conventional photosensor shown in FIG. 59 incorporates a photodiode D1, a capacitor C2, and a thin-film transistor M2. The anode of the photodiode D1 is connected to wiring RST, which is for supplying a reset signal. The cathode of the photodiode D1 is connected to one of the electrodes of the capacitor C2 and the gate of the thin-film transistor M2. The drain of the thin-film transistor M2 is connected to wiring VDD, and the source thereof is connected to wiring OUT. The other electrode of the capacitor C2 is connected to wiring RWS, which is for supplying a readout signal.

In this configuration, the reset signal and the readout signal are respectively supplied to the wiring RST and the wiring RWS at predetermined times, thus enabling obtaining sensor output $V_{PIX}$ that is in accordance with the amount of light received by the photodiode D1. A description will now be given of operations of the conventional photosensor shown in FIG. 59, with reference to FIG. 60. Note that in FIG. 60, the reset signal at low level (e.g., −7 volts) is shown as $V_{RST.L}$, the reset signal at high level (e.g., 0 volts) is shown as $V_{RST.H}$, the readout signal at low level (e.g., 0 volts) is shown as $V_{RWS.L}$, and the readout signal at high level (e.g., 15 volts) is shown as $V_{RWS.H}$.

First, when the high level reset signal $V_{RST.H}$ is supplied to the wiring RST, the photodiode D1 becomes forward biased, and the potential $V_{INT}$ of the gate of the thin-film transistor M2 is expressed by Equation (1) below.

$$V_{INT}=V_{RST.H}-V_F \quad (1)$$

In Equation (1), $V_F$ is the forward voltage of the photodiode D1. Since $V_{INT}$ is lower than the threshold voltage of the thin-film transistor M2 at this time, the thin-film transistor M2 is in a non-conducting state in the reset period.

Next, the reset signal returns to the low level $V_{RST.L}$ (time t=RST in FIG. 60), and thus the photocurrent integration period (sensing period indicated by $T_{INT}$ shown in FIG. 60) begins. In the integration period, a photocurrent that is proportionate to the amount of light that has been incident on the photodiode D1 flows out of the capacitor C2 to discharge the capacitor C2. Accordingly, the potential $V_{INT}$ of the gate of the thin-film transistor M2 when the integration period ends is expressed by Equation (2) below.

$$V_{INT}=V_{RST.H}-V_F-\Delta V_{RST} \cdot C_{PD}/C_T-I_{PHOTO} \cdot T_{INT}/C_T \quad (2)$$

In Equation (1), $\Delta V_{RST}$ is the pulse height of the reset signal ($V_{RST.H}-V_{RST.L}$), $I_{PHOTO}$ is the photocurrent of the photodiode D1, and $T_{INT}$ is the length of the integration period. $C_{PD}$ is the capacitance of the photodiode D1. $C_T$ is the sum of the capacitance of the capacitor C2, the capacitance $C_{PD}$ of the photodiode D1, and the capacitance $C_{TFT}$ of the thin-film transistor M2. In the integration period as well, $V_{INT}$ is lower than the threshold voltage of the thin-film transistor M2, and therefore the thin-film transistor M2 is in the non-conducting state.

When the integration period ends, the readout signal rises at a time t=RWS shown in FIG. 60, and thus the readout period begins. Note that the readout period continues while the readout signal is at the high level. At this point, the injection of charge into the capacitor C2 occurs. As a result, the potential $V_{INT}$ of the gate of the thin-film transistor M2 is expressed by Equation (3) below.

$$V_{INT}=V_{RST.H}-V_F-\Delta V_{RST} \cdot C_{PD}/C_T-I_{PHOTO} \cdot T_{INT}/C_T+\Delta V_{RWS} \cdot C_{INT}/C_T \quad (3)$$

$\Delta V_{RWS}$ is the pulse height of the readout signal ($V_{RWS.H}-V_{RWS.L}$). Accordingly, since the potential $V_{INT}$ of the gate of the thin-film transistor M2 becomes higher than the threshold voltage, the thin-film transistor M2 enters the conducting state and functions as a source follower amplifier along with a bias thin-film transistor M3 provided at the end of the wiring OUT in each column. In other words, the sensor output voltage $V_{PIX}$ from the thin-film transistor M2 is proportionate to the integral value of the photocurrent of the photodiode D1 in the integration period.

Note that in FIG. 60, the solid line waveform indicates changes in the potential $V_{INT}$ in the case where a small amount of light is incident on the photodiode D1, and the broken line waveform indicates changes in the potential $V_{INT}$ in the case where light at the saturation level has been incident on the photodiode D1. In FIG. 60, $\Delta V_{SIG}$ is the potential difference proportionate to the amount of light that has been incident on the photodiode D1. $\Delta V_{INT}$ in FIG. 60 is the upthrust amount of the potential $V_{INT}$ due to the readout signal being applied from the wiring RWS to the photosensor in the readout period.

CITATION LIST

Patent Literature

PTL 1: JP 2006-3857A
PTL 2: WO 2007/145346
PTL 3: WO 2007/145347

DISCLOSURE OF INVENTION

Problem to be Solved by the Invention

In a display device including a photosensor in a pixel such as that described above, the potential difference at a storage node at the end of the storage period in the case where there are different levels of illuminance (e.g., the case of a dark condition and the case where light at the saturation level has been incident) is equal to the potential difference at the storage node after the upthrust in the readout period in each case. In other words, the difference between the potential of the storage node at the point in time when the storage period ends in the case of the dark condition (referred to here as $V_{INT1}$) and the potential of the storage node at the point in time when the storage period ends in the case where light at the saturation level has been incident (referred to here as $V_{INT2}$) is equal to the potential difference between the potential of the storage node after the upthrust in the readout period in the case of the dark condition (referred to here as $V_{INT3}$) and the potential of the storage node after the upthrust in the readout period in the case where light at the saturation level has been incident (referred to here as $V_{INT4}$).

However, the greater the difference between $V_{INT3}$ and $V_{INT4}$ is, the higher the sensitivity, the higher the S/N ratio, and the better the characteristics of the obtained photosensor can be. Accordingly, an object of the present invention is to provide a display device that has a highly sensitive photosensor due to causing the potential difference at the storage node after the upthrust ($V_{INT3}-V_{INT4}$) to be greater than the potential difference at the storage node generated by the difference in illuminance on the light receiving face at the point in time when the integration period ends ($V_{INT1}-V_{INT2}$).

Means for Solving Problem

In order to solve the above-described problems, a display device according to the present invention is a display device including a photosensor in a pixel region of an active matrix substrate, the photosensor including: a photodetection element that receives incident light; reset signal wiring that supplies a reset signal to the photosensor; readout signal wiring that supplies a readout signal to the photosensor; a storage node whose potential changes in accordance with the amount of light received by the photodetection element in a sensing period, the sensing period being from when the reset signal is supplied until when the readout signal is supplied; an amplification element that amplifies the potential of the storage node in accordance with the readout signal; and a sensor switching element for reading out the potential amplified by the amplification element to output wiring as sensor circuit output.

Effects of the Invention

According to the present invention, by providing an amplification element that amplifies the potential at the storage node in accordance with the readout signal, the potential difference at the storage node after the upthrust is greater than the potential difference of the storage node generated by the difference in illuminance on the light receiving face at the point in time when the integration period ends. For example, the difference between the potential of the storage node after the upthrust in the readout period in the case of the dark condition and the potential of the storage node after the upthrust in the readout period in the case where light at the saturation level has been incident is greater than the difference between the potential of the storage node at the point in time when the storage period ends in the case of the dark condition and the potential of the storage node at the point in time when the storage period ends in the case where light at the saturation level has been incident. This enables providing a display device having a highly sensitive photosensor.

DESCRIPTION OF THE INVENTION

Figure 1:
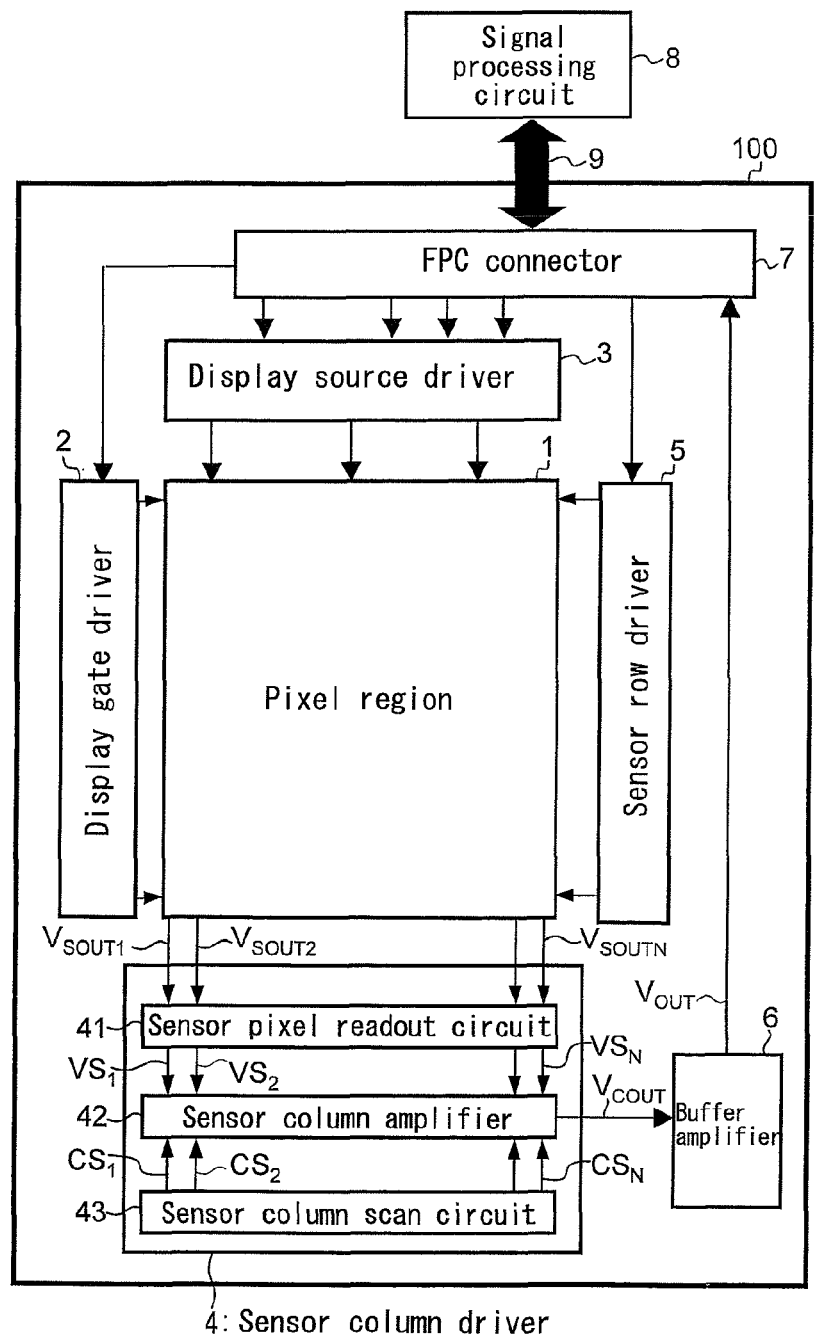
FIG. 1 is a block diagram showing a schematic configuration of a display device according to an embodiment of the present invention.

A display device according to an embodiment of the present invention is a display device including a photosensor in a pixel region of an active matrix substrate, the photosensor including: a photodetection element that receives incident light; reset signal wiring that supplies a reset signal to the photosensor; readout signal wiring that supplies a readout signal to the photosensor; a storage node whose potential changes in accordance with the amount of light received by the photodetection element in a sensing period, the sensing period being from when the reset signal is supplied until when the readout signal is supplied; an amplification element that amplifies the potential of the storage node in accordance with the readout signal; and a sensor switching element for reading out the potential amplified by the amplification element to output wiring as sensor circuit output.

According to this configuration, by providing an amplification element that amplifies the potential of the storage node in accordance with the readout signal, the potential difference at the storage node after the upthrust is greater than the potential difference at the storage node generated by the difference in illuminance on the light receiving face at the point in time when the integration period ends. For example, the difference between the potential of the storage node after the upthrust in the readout period in the case of the dark condition and the potential of the storage node after the upthrust in the readout period in the case where light at the saturation level has been incident is greater than the difference between the potential of the storage node at the point in time when the storage period ends in the case of the dark condition and the potential of the storage node at the point in time when the storage period ends in the case where light at the saturation level has been incident. Note that this potential difference amplification function is not limited to the case of the dark condition and the case where light at the saturation level has been incident, but rather is realized between any levels of illuminance. This enables providing a display device having a highly sensitive photosensor.

In the above-described display device, it is possible to use, for example, a variable capacitor as the amplification element. In this case, it is possible to use, for example, an MOS capacitor including the readout signal wiring, an insulating film, and a p-type semiconductor region formed in a silicon film, as the variable capacitor. Alternatively, it is possible to use an MOS capacitor including a gate electrode of the sensor switching element, an insulating film, and an n-type semiconductor region formed in a silicon film, as the variable capacitor. According to the former configuration, the readout signal wiring can be used as the gate electrode of the variable capacitor, thus having an advantage of eliminating the need to provide wiring and a contact for connecting the readout signal wiring and the gate electrode.

Also, in the above-described display device, it is possible to use, for example, a p-channel thin-film transistor as the amplification element. In this case, a configuration is preferable in which, in the p-channel thin-film transistor, a channel region is formed in a wide portion of a silicon film that connects the photodetection element and the storage node, and a gate electrode of the p-channel thin-film transistor is provided so as to overlap the wide portion. This is because this configuration enables shortening the boundary length, thus making it possible to prevent a reduction in dynamic range due to a parasitic capacitance or leakage current. Alternatively, in the above-described display device, an n-channel thin-film transistor may be used as the amplification element.

Alternatively, in the above-described display device, a configuration is possible in which a diode including a gate electrode over a channel is used as the amplification element. This configuration enables shortening the boundary length.

Also, in the above-described display device, a configuration is preferable in which the display device includes: a light shielding film provided on a side of the photodetection element that is opposite to a light receiving face thereof, and an electrode provided opposing the light shielding film so as to form a series capacitor in series with a parasitic capacitance between the light shielding film and the photodetection element, wherein the electrode is electrically connected to the readout wiring. This configuration has an effect of enabling mitigating the influence exerted by the parasitic capacitance between the light shielding film and the photodetection element on the change in the potential of the storage node in the integration period.

Also, in the above-described display device, a configuration is preferable in which the display device includes a plurality of the photodetection elements in the pixel region, wherein the plurality of photodetection elements are connected in parallel, and the amplification element is connected to a terminal photodetection element among the plurality of photodetection elements. Connecting a plurality of photodetection elements in parallel in this way enables increasing the photocurrent and improving sensitivity.

In the above-described display device, a configuration is preferable in which the sensor switching element is a three-terminal switching element, a gate electrode among the three terminals is connected to the storage node, and one of the two remaining terminals among the three terminals is connected to the output wiring. According to this configuration, a single sensor switching element is sufficient, thus enabling simplifying the circuit configuration of the photosensor. Note that in the above-described display device, a configuration is possible in which the display device further includes a switching element for resetting the sensor switching element.

In the above-described display device, it is preferable that the amplification element has a threshold voltage at which the amplification element switches on/off, between a low level potential and a high level potential of the readout signal.

Also, the above-described display device can be implemented as a liquid crystal display device further including: a common substrate opposing the active matrix substrate; and liquid crystal sandwiched between the active matrix substrate and the common substrate.

The following is a description of more specific embodiments of the present invention with reference to the drawings. Note that although the following embodiments show examples of configurations in which a display device according to the present invention is implemented as a liquid crystal display device, the display device according to the present invention is not limited to a liquid crystal display device, and is applicable to any display device that uses an active matrix substrate. It should also be noted that due to having a photosensor, the display device according to the present invention is envisioned to be used as, for example, a display device with a touch panel that performs input operations after detecting an object that is close to the screen, or a bidirectional communication display device that is equipped with a display function and an image capture function.

Also, for the sake of convenience in the description, the drawings that are referred to below show simplifications of among the constituent members of the embodiments of the present invention, only relevant members that are necessary for describing the present invention. Accordingly, the display device according to the present invention may include any constituent members that are not shown in the drawings that are referred to in this specification. Also, regarding the dimensions of the members in the drawings, the dimensions of the actual constituent members, the ratios of the dimensions of the members, and the like are not shown faithfully.

Embodiment 1

Figure 2:
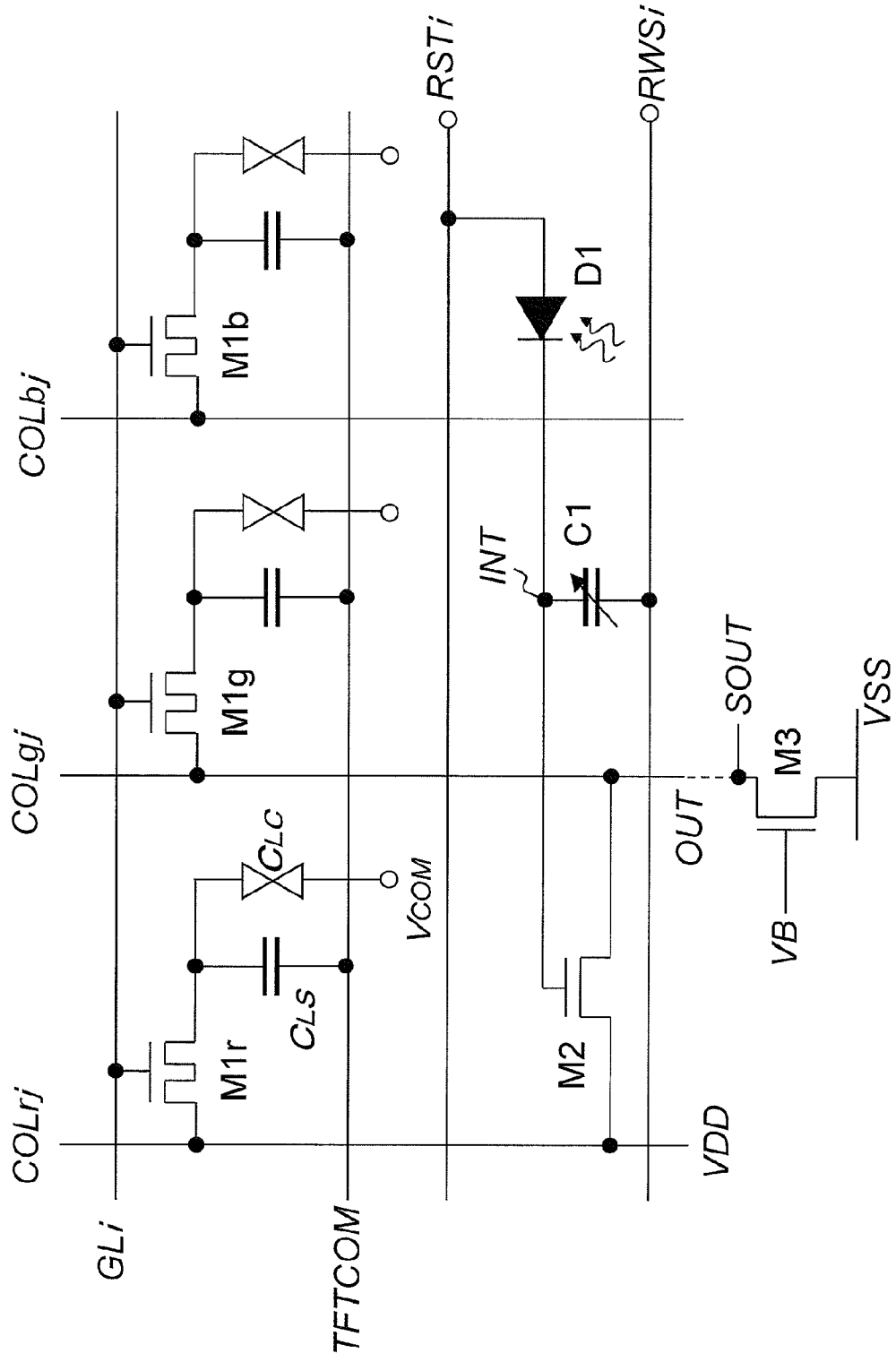
FIG. 2 is an equivalent circuit diagram showing a configuration of a pixel in a display device according to Embodiment 1 of the present invention.

First is a description of a configuration of an active matrix substrate included in a liquid crystal display device according to Embodiment 1 of the present invention with reference to FIGS. 1 and 2.

FIG. 1 is a block diagram showing a schematic configuration of an active matrix substrate 100 included in the liquid crystal display device according to an embodiment of the present invention. As shown in FIG. 1, the active matrix substrate 100 includes at least a pixel region 1, a display gate driver 2, a display source driver 3, a sensor column driver 4, a sensor row driver 5, a buffer amplifier 6, and an FPC connector 7 on a glass substrate. Also, a signal processing circuit 8 for processing image signals picked up by a photodetection element (described later) in the pixel region 1 is connected to the active matrix substrate 100 via the FPC connector 7 and an FPC 9.

Note that the above constituent members on the active matrix substrate 100 can also be formed monolithically on the glass substrate by a semiconductor process. Alternatively, a configuration is possible in which the amplifier and various drivers among the above constituent members are mounted on the glass substrate by COG (Chip On Glass) technology or the like. As another alternative, it is possible for at least a portion of the above constituent members shown on the active matrix substrate 100 in FIG. 1 to be mounted on the FPC 9. The active matrix substrate 100 is attached to a common substrate (not shown) that has a common electrode formed on the entire face thereof and a liquid crystal material is enclosed in the gap therebetween.

The pixel region 1 is a region in which a plurality of pixels are formed in order to display an image. In the present embodiment, a photosensor for picking up an image is provided in each pixel in the pixel region 1. FIG. 2 is an equivalent circuit diagram showing the disposition of a pixel and a photosensor in the pixel region 1 of the active matrix substrate 100. In the example in FIG. 2, each pixel is formed by three colors of picture elements, namely R (red), G (green), and B (blue), and one photosensor is provided in each of the pixels composed of these three picture elements. The pixel region 1 has pixels disposed in a matrix having M rows×N columns, and photosensors that are likewise disposed in a matrix having M rows×N columns. Note that as described above, the number of picture elements is M×3N.

For this reason, as shown in FIG. 2, the pixel region 1 has, as wiring for the pixels, gate lines GL and source lines COL that are disposed in a matrix. The gate lines GL are connected to the display gate driver 2. The source lines COL are connected to the display source driver 3. Note that the gate lines GL are provided in M rows in the pixel region 1. Hereinafter, the notation GLi (i=1 to M) is used when there is a need to distinguish between individual gate lines GL in the description. Meanwhile, three source lines COL are provided in each pixel in order to respectively supply image data to the three picture elements in each pixel as described above. The notations COLrj, COLgj, and COLbj (j=1 to N) are used when there is a need to distinguish between individual source lines COL in the description.

Thin-film transistors (TFTs) M1 are provided as switching elements for the pixels at intersections between the gate lines GL and the source lines COL. Note that in FIG. 2, the thin-film transistors M1 provided in the red, green, and blue picture elements are designated by M1r, M1g, and M1b, respectively. In each thin-film transistor M1, the gate electrode is connected to one of the gate lines GL, the source electrode is connected to one of the source lines COL, and the drain electrode is connected to a pixel electrode, which is not shown. Accordingly, as shown in FIG. 2, a liquid crystal capacitor $C_{LC}$ is formed between the drain electrode of each thin-film transistor M1 and the common electrode (VCOM). Also, an auxiliary capacitor $C_{LS}$ is formed between each drain electrode and a TFTCOM.

In FIG. 2, the picture element driven by the thin-film transistor M1r, which is connected to the intersection between one gate line GLi and one source line COLrj, is provided with a red color filter so as to correspond to that picture element, and red image data is supplied from the display source driver 3 to that picture element via the source line COLrj, and thus that picture element functions as a red picture element. Also, the picture element driven by the thin-film transistor M1g, which is connected to the intersection between the gate line GLi and the source line COLgj, is provided with a green color filter so as to correspond to that picture element, and green image data is supplied from the display source driver 3 to that picture element via the source line COLgj, and thus that picture element functions as a green picture element. Furthermore, the picture element driven by the thin-film transistor M1b, which is connected to the intersection between the gate line GLi and the source line COLbj, is provided with a blue color filter so as to correspond to that picture element, and blue image data is supplied from the display source driver 3 to that picture element via the source line COLbj, and thus that picture element functions as a blue picture element.

Note that in the example in FIG. 2, the photosensors are provided in the ratio of one per pixel (three picture elements) in the pixel region 1. However, the disposition ratio of the pixels and photosensors is arbitrary and not limited to this example only. For example, one photosensor may be disposed per picture element, and a configuration is possible in which one photosensor is disposed for a plurality of pixels.

As shown in FIG. 2, the photosensor incorporates a photodiode D1 serving as a photodetection element, a capacitor C1 (amplification element), and a thin-film transistor M2. In the present embodiment, the capacitor C1 that functions as an amplification element is a variable capacitor.

In the example in FIG. 2, the source line COLr also serves as wiring VDD, which is for supplying a constant voltage $V_{DD}$ from the sensor column driver 4 to the photosensor. Also, the source line COLg also serves as wiring OUT for sensor output.

The anode of the photodiode D1 is connected to wiring RST serving as reset signal wiring for supplying a reset signal. The cathode of the photodiode D1 is connected to one of the electrodes of the capacitor C1 and the gate of the thin-film transistor M2. The drain of the thin-film transistor M2 is connected to the wiring VDD, and the source thereof is connected to the wiring OUT. In FIG. 2, the connection point (storage node) between the cathode of the photodiode D1, the one electrode of the capacitor C1, and the gate of the thin-film transistor M2 is designated by INT. The other electrode of the capacitor C1 is connected to wiring RWS serving as readout signal wiring for supplying a readout signal. The wiring RST and RWS are connected to the sensor row driver 5. Since the wiring RST and RWS are provided in each row, the notations RSTi and RWSi (i=1 to M) are used hereinafter when there is a need to distinguish between the pairs of wiring.

The sensor row driver 5 successively selects a set of wiring RSTi and wiring RWSi shown in FIG. 2 at a predetermined time interval $t_{row}$. Accordingly, each photosensor row in the pixel region 1 from which a signal charge is to be read out is successively selected.

Note that as shown in FIG. 2, the end of the wiring OUT is connected to the drain of a thin-film transistor M3, which is an insulated gate field effect transistor. Also, the drain of this thin-film transistor M3 is connected to output wiring SOUT, and a potential $V_{SOUT}$ of the drain of the thin-film transistor M3 is output to the sensor column driver 4 as an output signal from the photosensor. The source of the thin-film transistor M3 is connected to the wiring VSS. The gate of the thin-film transistor M3 is connected to a reference voltage power supply (not shown) via reference voltage wiring VB.

Figure 3:
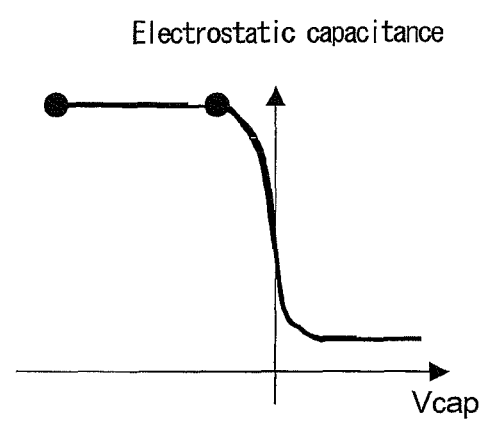
FIG. 3 is a CV characteristics diagram of a capacitor included in the photosensor according to Embodiment 1.
Figure 4:
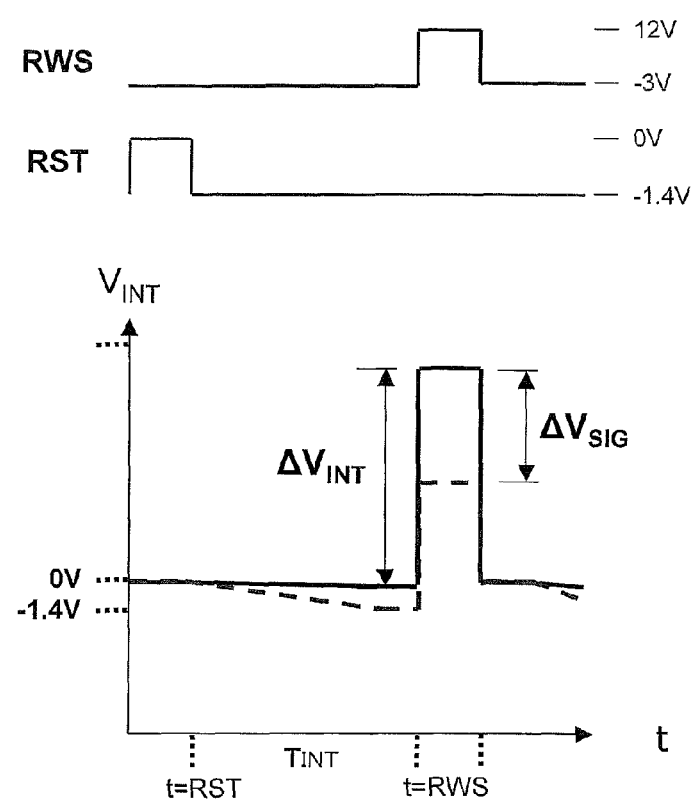
FIG. 4 is a timing chart showing the waveforms of drive signals and changes in the potential of a storage node in the photosensor according to Embodiment 1.
Figure 60:
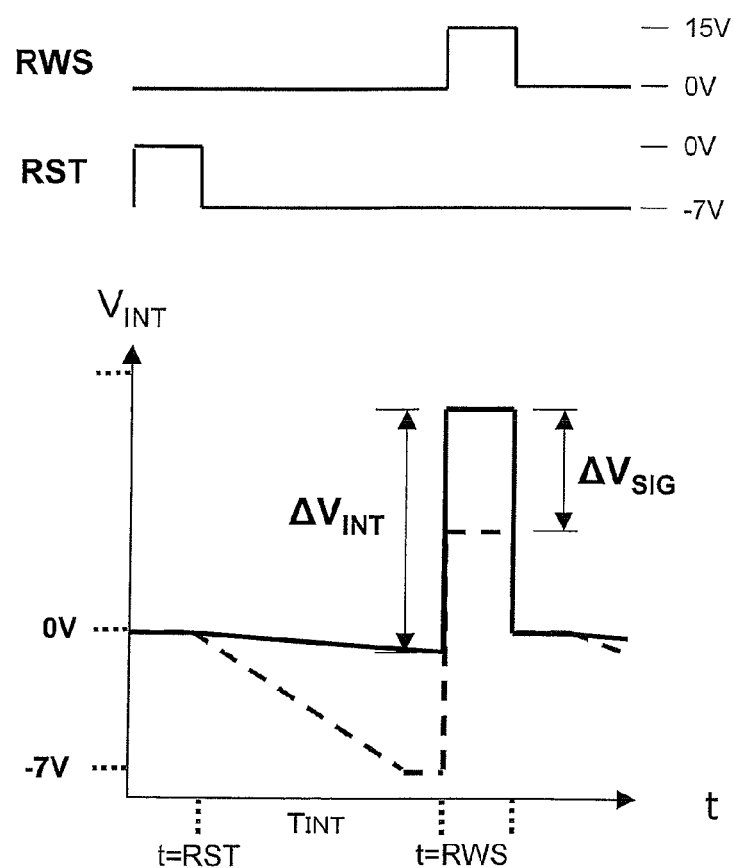
FIG. 60 is a timing chart showing waveforms of drive signals and changes in the potential of a storage node in the conventional photosensor.

FIG. 3 is a diagram showing CV characteristics of the capacitor C1. In FIG. 3, the horizontal axis indicates an interelectrode voltage $V_{CAP}$ of the capacitor C1, and the vertical axis indicates electrostatic capacitance. As shown in FIG. 3, although the capacitor C1 has a constant electrostatic capacitance while the interelectrode voltage $V_{CAP}$ is small, the capacitor C1 has the characteristic that the electrostatic capacitance changes rapidly near the threshold of the interelectrode voltage $V_{CAP}$. This enables dynamically changing the characteristics of the capacitor C1 using the potential of the readout signal from the wiring RWS. By using the capacitor C1 having such characteristics, the photosensor of the present embodiment can amplify the change in the potential of the storage node in the integration period $T_{INT}$ when reading it out, as shown in FIG. 4. In the example in FIG. 4, which is merely one embodiment, the low level $V_{RST.L}$ of the reset signal is −1.4 volts, and the high level $V_{RST.H}$ of the reset signal is 0 volts. Also, the low level $V_{RWS.L}$ of the readout signal is −3 volts, and the high level $V_{RWS.H}$ of the readout signal is 12 volts. In FIG. 4 as well, the solid line waveform indicates changes in the potential $V_{INT}$ in the case where a small amount of light is incident on the photodiode D1, the broken line waveform indicates changes in the potential $V_{INT}$ in the case where light at the saturation level has been incident on the photodiode D1, and $\Delta V_{SIG}$ is the potential difference proportionate to the amount of light that has been incident on the photodiode D1. As is clear from a comparison of the conventional example shown in FIG. 60 and FIG. 4, with the photosensor of the present embodiment, although the change in the potential of the storage node in the integration period $T_{INT}$ in the case where light at the saturation level has been incident is smaller than that in the conventional photosensor, the potential of the storage node is amplified when being read out in the readout period (while the potential of the readout signal is at the high level $V_{RWS.H}$).

The following describes the reading out of sensor output from the pixel region 1 with reference to FIG. 4. First, when the reset signal supplied from the sensor row driver 5 to the wiring RST rises from the low level ($V_{RST.L}$) to the high level ($V_{RST.H}$), the photodiode D1 becomes forward biased, and the potential $V_{INT}$ of the connection point INT is expressed by Equation (4) below.

$$V_{INT} = V_{RST.H} - V_F \quad (4)$$

In Equation (4), $V_F$ is the forward voltage of the photodiode D1. Since $V_{INT}$ is lower than the threshold voltage of the thin-film transistor M2 at this time, the thin-film transistor M2 is in a non-conducting state in the reset period.

Next, the photocurrent integration period ($T_{INT}$) begins when the reset signal returns to the low level $V_{RST.L}$. In the integration period $T_{INT}$, a photocurrent that is proportionate to the amount of light that has been incident on the photodiode D1 flows in the capacitor C1 to discharge the capacitor C1. Accordingly, the potential $V_{INT}$ of the connection point INT when the integration period $T_{INT}$ ends is expressed by Equation (5) below.

$$V_{INT} = V_{RST.H} - V_F - \Delta V_{RST} \cdot C_{PD}/C_T - I_{PHOTO} \cdot t_{INT}/C_T \quad (5)$$

In Equation (5), $\Delta V_{RST}$ is the pulse height of the reset signal ($V_{RST.H} - V_{RST.L}$), $I_{PHOTO}$ is the photocurrent of the photodiode D1, and $t_{INT}$ is the length of the integration period. $C_{PD}$ is the capacitance of the photodiode D1. $C_{TOTAL}$ is the overall capacitance of the photosensor circuit, that is to say, the total capacitance of the connection point INT, which is the sum of the capacitance $C_{INT}$ of the capacitor C1, the capacitance $C_{PD}$ of the photodiode D1, and the capacitance $C_{TFT}$ of the thin-film transistor M2. In the integration period as well, $V_{INT}$ is lower than the threshold voltage of the thin-film transistor M2, and therefore the thin-film transistor M2 is in the non-conducting state.

When the integration period ends, the readout signal supplied to the wiring RWS rises, and thus the readout period begins. At this point, the injection of charge into the capacitor C1 occurs. Then when the potential $V_{INT}$ of the connection point INT has become higher than the threshold voltage of the thin-film transistor M2, the thin-film transistor M2 enters a conductive state and functions as a source follower amplifier along with the bias thin-film transistor M3 provided at the end of the wiring OUT in each column. In the photosensor of the present embodiment, the output signal voltage from the output wiring SOUT from the drain of the thin-film transistor M3 corresponds to the amplified integral value of the photocurrent of the photodiode D1 in the integration period. The principles underlying this will be described later.

As described above, in the present embodiment, operations are performed cyclically where one cycle involves initialization by a reset pulse, integration of the photocurrent in the integration period, and readout of sensor output in the readout period.

Figure 5:
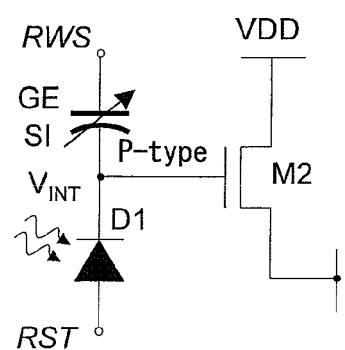
FIG. 5 is an equivalent circuit diagram of the photosensor according to the embodiment.
Figure 6:
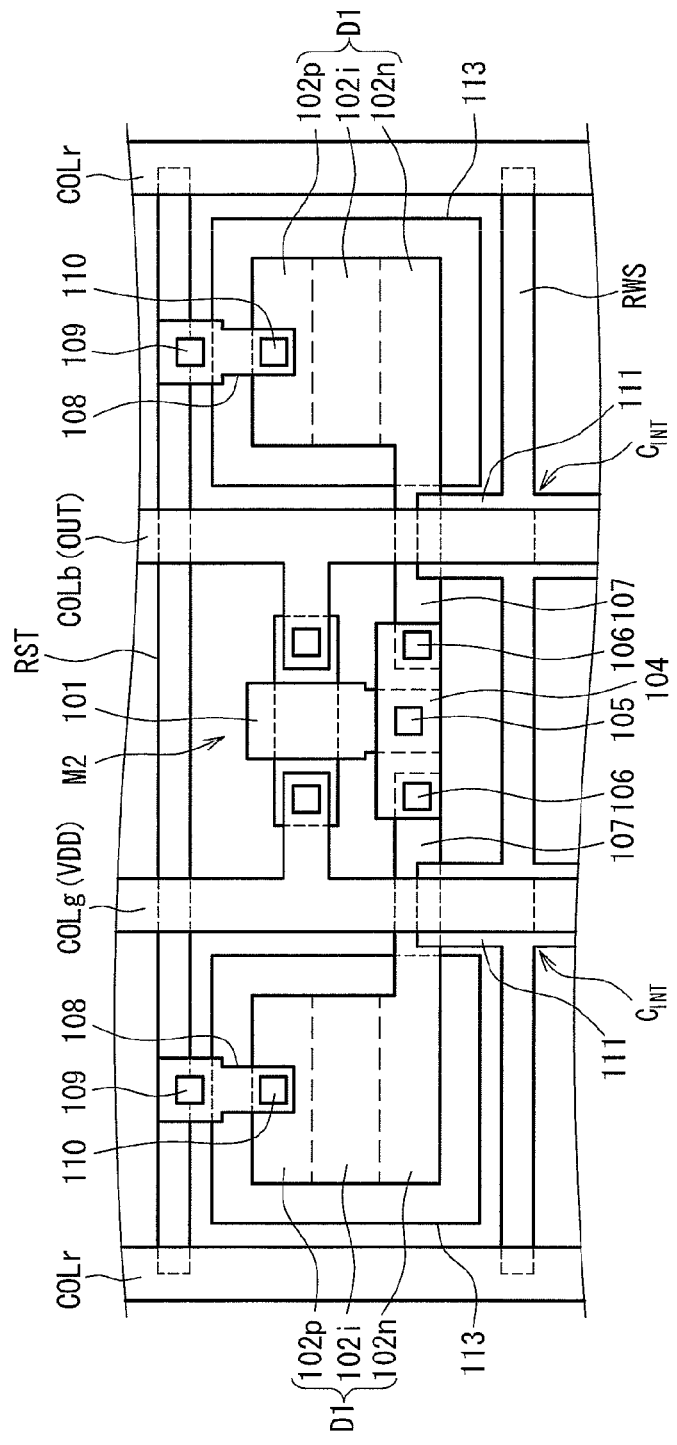
FIG. 6 is a plan view showing an example of a planar structure of the photosensor according to the embodiment.
Figure 7:
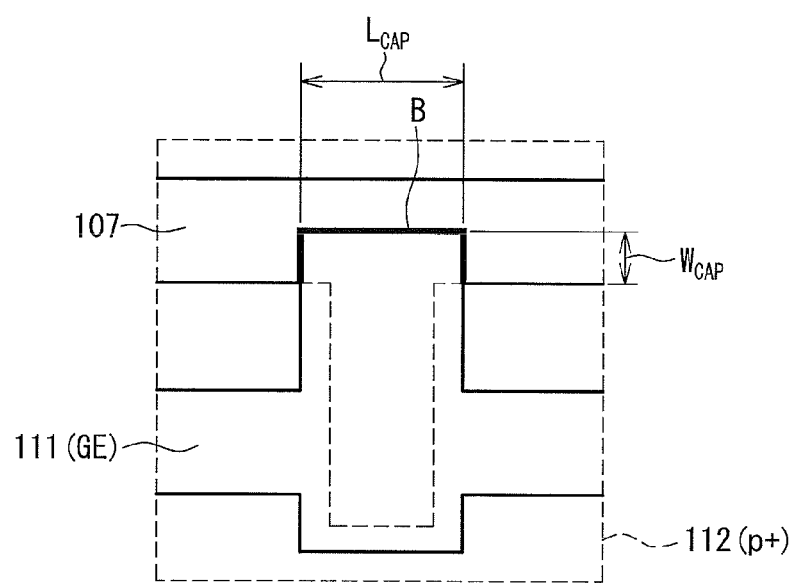
FIG. 7 is an enlarged view of a region where a capacitor C1 is formed.
Figure 8:
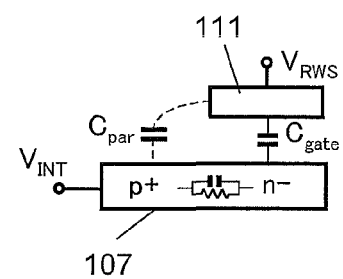
FIG. 8 is a schematic cross-sectional diagram showing connection relationships between regions in the photosensor according to the embodiment.

The following describes a specific structure of the photosensor of the present embodiment with reference to the drawings. FIG. 5 is an equivalent circuit diagram of the photosensor according to the present embodiment. FIG. 6 is a plan view showing an example of the planar structure of the photosensor according to the present embodiment. FIG. 7 is an enlarged view of a region where the capacitor C1 is formed. FIG. 8 is a schematic cross-sectional diagram showing connection relationships between regions in the photosensor according to the present embodiment.

As shown in FIG. 5, the photosensor of the present embodiment includes the capacitor C1, which is a variable capacitor, as an amplification element. In the present embodiment, the capacitor C1 is a p-channel MOS capacitor. Note that although the thin-film transistor M2 is provided in the region between the source lines COLg and COLb, and one capacitor C1/photodiode D1 pair is provided on both sides of the thin-film transistor M2 in FIG. 6, a configuration is possible in which only one capacitor C1/photodiode D1 pair is provided.

As shown in FIG. 6, the photosensor of the present embodiment includes the thin-film transistor M2 in the region between the source lines COLg and COLb. The photodiode D1 is a PIN diode having a lateral structure, in which a p-type semiconductor region 102p, an e semiconductor region 102i, and an n-type semiconductor region 102n are formed in series on a silicon film serving as the base. The p-type semiconductor region 102p serves as the anode of the photodiode D1, and is connected to the wiring RST via wiring 108 and contacts 109 and 110. The n-type semiconductor region 102n serves as the cathode of the photodiode D1, and is connected to a gate electrode 101 of the thin-film transistor M2 via an extension portion 107 of the silicon film, contacts 105 and 106, and wiring 104.

In this configuration, the wiring RST and the wiring RWS are formed from the same metal as the gate electrode 101 of the thin-film transistor M2 and in the same process. Also, the wiring 104 and the wiring 108 are formed from the same metal as the source lines COL and in the same process. A light shielding film 113 for preventing light from a backlight from being incident on the sensor is provided on the back face of the photodiode D1.

Also, as shown in FIGS. 6 to 8, the capacitor C1 is formed by a wide portion 111 formed in the wiring RWS, the extension portion 107 of the silicon film, and an insulating film (not shown) disposed therebetween. Specifically, the wide portion 111, which has the same potential as the wiring RWS, functions as the gate electrode of the capacitor C1. A region 112 shown in FIG. 7 is a p+ region formed by doping an n-type silicon film with a p-type impurities such as boron. Note that since the wide portion 111 functions as a mask during doping with the p-type impurities, the extension portion 107 serves as a p+ region, and the portion of the silicon film below the wide portion 111 forms an n− region, as shown in FIG. 8.

Figure 9:
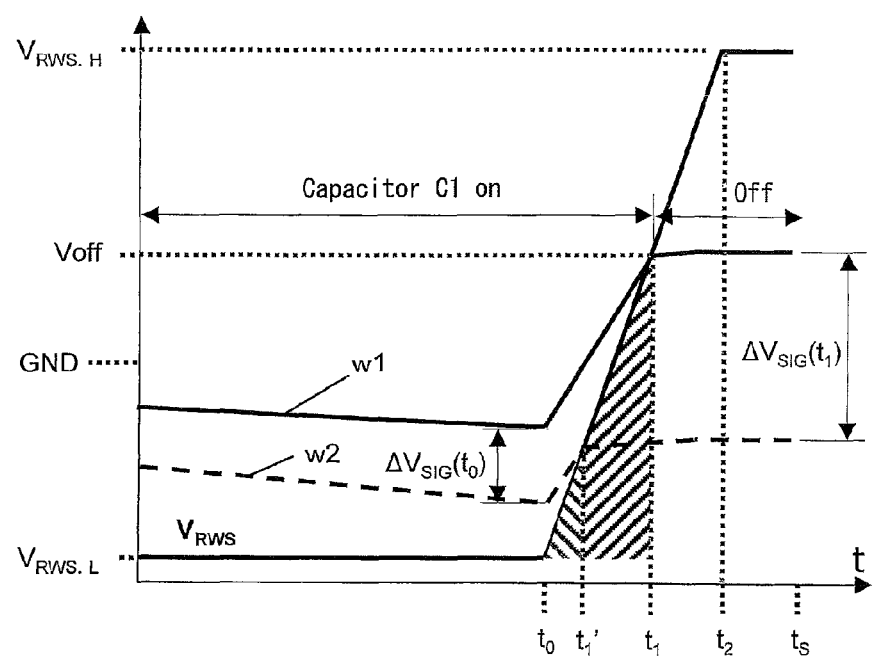
FIG. 9 is a waveform diagram showing changes in the potential $V_{INT}$ of the storage node from the end of an integration period and throughout a readout period.

The following describes readout operations performed by the photosensor of the present embodiment. FIG. 9 is a waveform diagram showing changes in the potential $V_{INT}$ of the storage node from the end of the integration period and throughout the readout period. In FIG. 9, a solid line waveform w1 indicates changes in the potential $V_{INT}$ in the case where a small amount of light is incident on the photodiode D1, and a broken line waveform w2 indicates changes in the potential $V_{INT}$ in the case where light has been incident on the photodiode D1. Also, a time $t_0$ is the time when the readout signal supplied from the wiring RWS starts rising from the low level $V_{RWS.L}$, and a time $t_2$ is the time when the readout signal reaches the high level $V_{RWS.H}$. A time is is the time when the thin-film transistor M2 turns on and sampling of the sensor output is performed. A time $t_1$ is the time when the readout signal reaches a threshold voltage $V_{off}$ of the capacitor C1. In other words, the operation characteristics of the capacitor C1 change depending on the magnitude relationship between the potential supplied from the wiring RWS to the wide portion 111 and the threshold voltage $V_{off}$. Also, a time $t_1'$ is the time when the readout signal reaches the threshold voltage $V_{off}$ of the capacitor C1 in the case of the waveform w2 (the case where light has been incident on the photodiode D1).

Figure 10A:
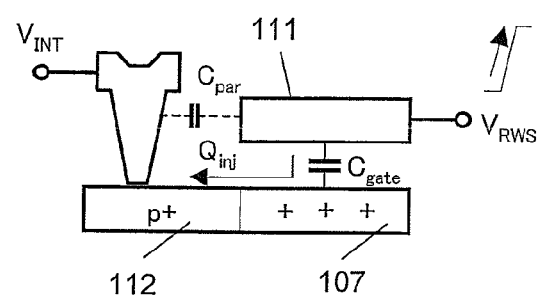
FIG. 10A is a schematic cross-sectional diagram showing movements of charge when the potential of a gate electrode in the capacitor C1 is lower than the threshold voltage.
Figure 10B:
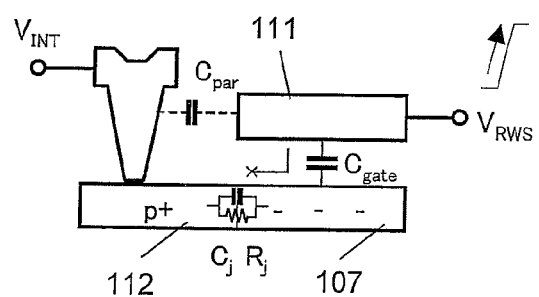
FIG. 10B is a schematic cross-sectional diagram showing movements of charge when the potential of the gate electrode in the capacitor C1 is higher than the threshold voltage.

FIGS. 10A and 10B are schematic cross-sectional diagrams showing differences in the movements of charge due to the potential of the gate electrode (wide portion 111) of the capacitor C1. As shown in FIGS. 9, 10A, and 10B, the capacitor C1 is constantly on at times before time $t_1$, and is off from $t_1$ onward. Specifically, while the potential of the wiring RWS is less than or equal to the threshold voltage $V_{off}$, movement of a charge $Q_{inj}$ occurs below the gate electrode (wide portion 111) as shown in FIG. 10A, and when the potential of the wiring RWS exceeds the threshold voltage $V_{off}$, movement of the charge $Q_{inj}$ ceases to occur below the gate electrode (wide portion 111) as shown in FIG. 10B. Based on the above, the potential $V_{INT}(t_s)$ of the storage node at the sample time $t_s$ after the potential of the readout signal supplied from the wiring RWS has reached the high level $V_{RWS.H}$ is as shown in Equation (6) below. Note that $\Delta V_{INT}$ shown in MG. 4 corresponds to the difference between $V_{INT}(t_0)$ and $V_{INT}(t_s)$, and is equivalent to $Q_{inj}/C_{INT}$.

[Math 1]

$$\begin{aligned}V_{INT}(t_s) &= V_{INT}(t_0) + \frac{Q_{inj}}{C_{TOTAL}} \\ &= V_{INT}(t_0) + \int \frac{C_{INT}}{C_{TOTAL}} dV \\ &= V_{INT}(t_0) + \left[\begin{array}{l}\int_{V_{RWS(L)}}^{V_{off}} \frac{C_{INT}}{C_{INT}+C_{TFT}+C_{DIODE}} dV + \\ \int_{V_{off}}^{V_{RWS(H)}} \frac{C'_{INT}}{C'_{INT}+C_{TFT}+C_{DIODE}} dV\end{array}\right]\end{aligned} \quad (6)$$

where $$C_{INT} = C_{par} + C_{gate}$$
$$C'_{INT} = C_{par} + \frac{C_{gate} \cdot C_j}{C_{gate} + C_j}$$

As shown in FIG. 9, according to the photosensor of the present embodiment, $\Delta V_{SIG}(t_0)$ at the end of the integration period is amplified to $\Delta V_{SIG}(t_1)$. Accordingly, the potential difference at the storage node after the upthrust is greater than the potential difference at the storage node generated by the difference in illuminance on the light receiving face at the point in time when the integration period ends. For example, the difference between the potential of the storage node after the upthrust in the readout period in the case of the dark condition and the potential of the storage node after the upthrust in the readout period in the case where light at the saturation level has been incident is greater than the difference between the potential of the storage node at the point in time when the storage period ends in the case of the dark condition and the potential of the storage node at the point in time when the storage period ends in the case where light at the saturation level has been incident. This enables realizing a photosensor with high sensitivity and a high S/N ratio.

Figure 11:
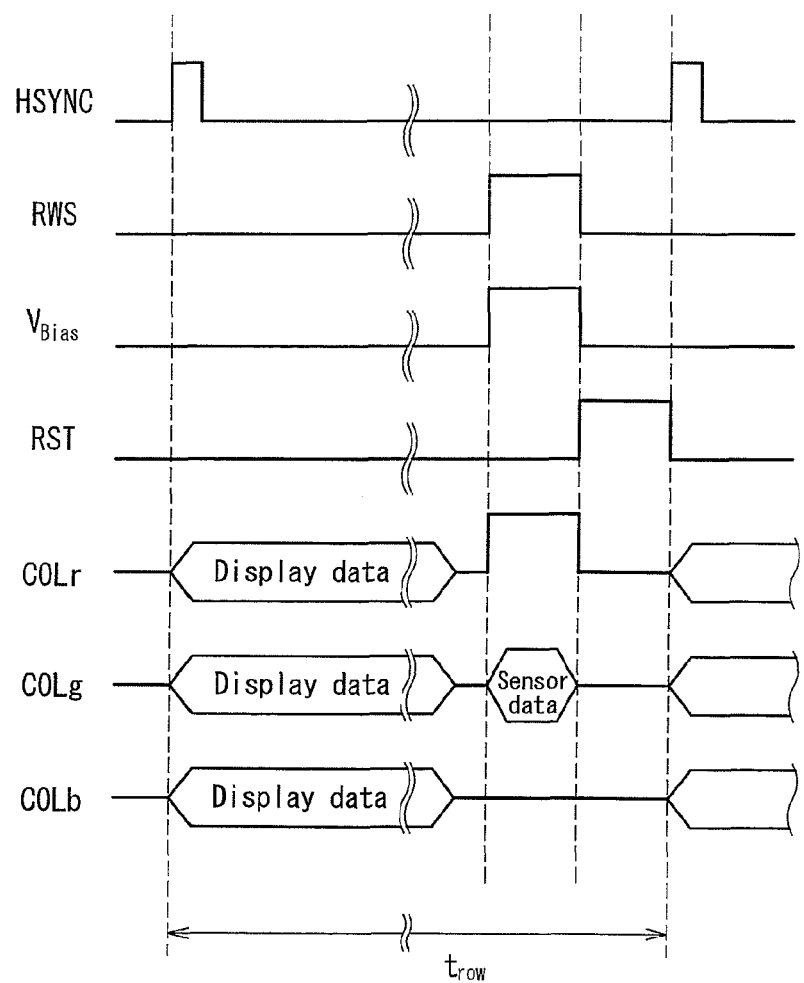
FIG. 11 is a timing chart showing sensing timing in the display device according to Embodiment 1.

Note that in the present embodiment, as previously mentioned, the source lines COLr and COLg are also used as the photosensor wiring VDD and the photosensor wiring OUT, and therefore it is necessary to distinguish between times when image data signals for display are input via the source lines COLr, COLg, and COLb, and times when sensor output is read out, as shown in FIG. 11. In the example in FIG. 11, after the input of the image data signal for display in a horizontal scan period has ended, the reading out of the sensor output is performed using a horizontal blanking period or the like. Note that HSYNC in FIG. 11 indicates a horizontal synchronization signal.

As shown in FIG. 1, the sensor column driver 4 includes a sensor pixel readout circuit 41, a sensor column amplifier 42, and a sensor column scan circuit 43. The sensor pixel readout circuit 41 is connected to the output wiring SOUT (see FIG. 2) that outputs the sensor output $V_{SOUT}$ from the pixel region 1. In FIG. 1, the sensor output that is output by output wiring SOUTj (j=1 to N) is designated by $V_{SOUTj}$. The sensor pixel readout circuit 41 outputs peak hold voltages $V_{Sj}$ of the sensor output $V_{SOUTj}$ to the sensor column amplifier 42. The sensor column amplifier 42 includes N column amplifiers that correspond to the photosensors in the N columns in the pixel region 1, and the column amplifiers amplify the peak hold voltages $V_{Sj}$ (j=1 to N), and output the resulting peak hold voltages to the buffer amplifier 6 as $V_{COUT}$. The sensor column scan circuit 43 outputs column select signals $CS_j$ (j=1 to N) to the sensor column amplifier 42 in order to successively connect the column amplifiers of the sensor column amplifier 42 to the output bound for the buffer amplifier 6.

Figure 12:
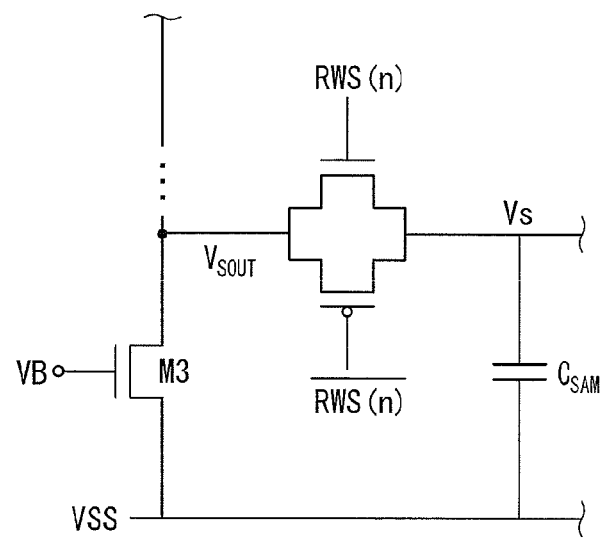
FIG. 12 is a circuit diagram showing an internal configuration of a sensor pixel readout circuit.
Figure 13:
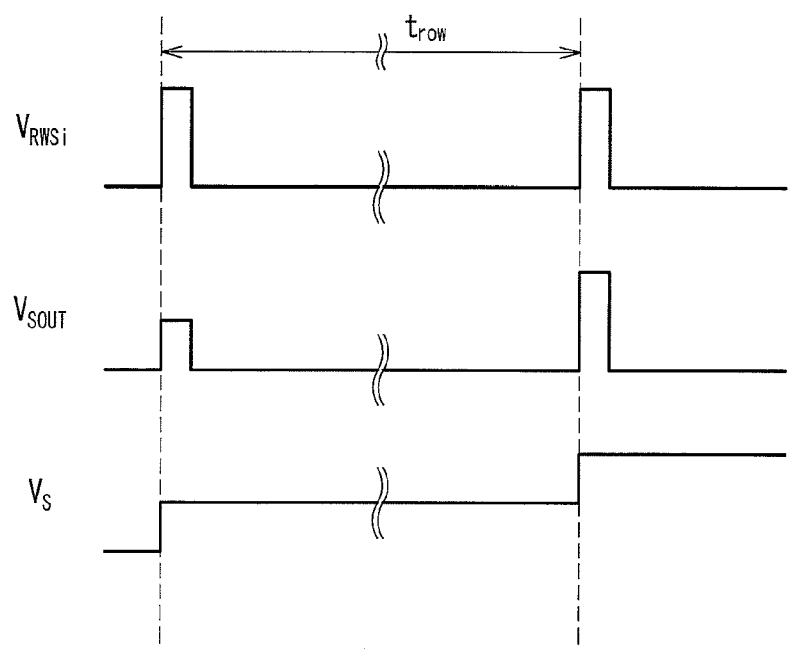
FIG. 13 is a waveform diagram showing a relationship between a readout signal, sensor output, and output of the sensor pixel readout circuit.

The following describes operations of the sensor column driver 4 and the buffer amplifier 6 that are performed after the sensor output $V_{SOUT}$ has been read out from the pixel region 1, with reference to FIGS. 12 and 13. FIG. 12 is a circuit diagram showing the internal configuration of the sensor pixel readout circuit 41. FIG. 13 is a waveform diagram showing a relationship between the readout signal, sensor output, and output of the sensor pixel readout circuit. As previously described, when the readout signal has risen to the high level $V_{RWS.H}$, the thin-film transistor M2 becomes conductive, and therefore a source follower amplifier is formed by the thin-film transistors M2 and M3, and the sensor output $V_{SOUT}$ is accumulated in a sample capacitor $C_{SAM}$ of the sensor pixel readout circuit 41. Accordingly, even after the readout signal has fallen to the low level $V_{RWS.L}$, in the selection period of that row ($t_{row}$), the output voltage $V_S$ from the sensor pixel readout circuit 41 to the sensor column amplifier 42 is kept at the same level as the peak value of the sensor output $V_{SOUT}$, as shown in FIG. 13.

Figure 14:
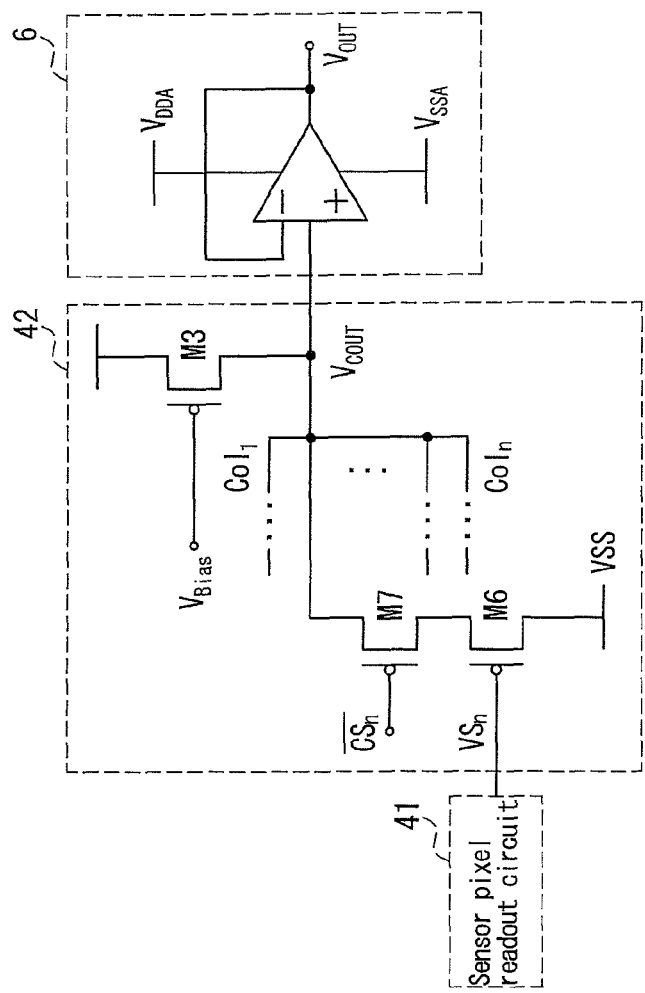
FIG. 14 is an equivalent circuit diagram showing a schematic configuration of a sensor column amplifier.

Next is a description of operations of the sensor column amplifier 42 with reference to FIG. 14. As shown in FIG. 14, the output voltages $V_{Sj}$ (j=1 to N) of the columns are input from the sensor pixel readout circuit 41 to the N column amplifiers of the sensor column amplifier 42. As shown in FIG. 14, each column amplifier is composed of thin-film transistors M6 and M7. The column select signals $C_{Sj}$ generated by the sensor column scan circuit 43 successively become on for each of the N columns in the select period of one row ($t_{row}$), and therefore the thin-film transistor M6 of only one of the N column amplifiers in the sensor column amplifier 42 is switched on, and only one of the output voltages $V_{Sj}$ (j=1 to N) of the columns is output as the output $V_{COUT}$ from the sensor column amplifier 42 via that thin-film transistor M6. The buffer amplifier 6 then amplifies the $V_{COUT}$ that has been output from the sensor column amplifier 42, and outputs the resulting $V_{COUT}$ to the signal processing circuit 8 as panel output (a photosensor signal) $V_{out}$.

Note that although the sensor column scan circuit 43 may scan the photosensor columns one column at a time as described above, there is no limitation to this, and a configuration is possible in which the photosensor columns are interlace-scanned. Also, the sensor column scan circuit 43 may be formed as a multi-phase drive scan circuit that has, for example, four phases.

According to the above configuration, the display device of the present embodiment obtains panel output $V_{OUT}$ that is in accordance with the amount of light received by the photodiode D1 formed in each pixel in the pixel region 1. The panel output $V_{OUT}$ is sent to the signal processing circuit 8, subjected to A/D conversion, and then accumulated in a memory (not shown) as panel output data. Specifically, the same number of panel output data pieces as the number of pixels (number of photosensors) in the pixel region 1 are accumulated in this memory. With use of the panel output data accumulated in the memory, the signal processing circuit 8 performs various types of signal processing such as image pickup and the detection of a touch area. Note that although the same number of panel output data pieces as the number of pixels (number of photosensors) in the pixel region 1 are accumulated in the memory of the signal processing circuit 8 in the present embodiment, due to constraints such as memory capacity, there is no need to necessarily accumulate the same number of panel output data pieces as the number of pixels.

Note that the configuration of Embodiment 1 has the advantage that since the wide portion 111 of the wiring RWS also serves as the gate electrode of the capacitor C1, the number of contacts can be lower than, for example, that in the later-described Embodiment 3 (contacts 118 and 119 shown in FIG. 21 in Embodiment 3), thus enabling the size of the photosensor circuit to be reduced. Note also that with the configuration of Embodiment 1, the wide portion 111 of the wiring RWS is disposed so as to shield the storage node INT from the source line COL. This has the advantage that noise interference from the source line COL that acts on the storage node INT can be reduced, in comparison with a configuration in which the source line COL is disposed above the storage node INT, as shown in the later-described Embodiment 3, for example.

Embodiment 2

The following is a description of Embodiment 2 of the present invention. Constituent elements having the same functions as constituent elements described in Embodiment 1 are given the same reference numerals as those in Embodiment 1, and detailed descriptions thereof will be omitted.

Figure 15:
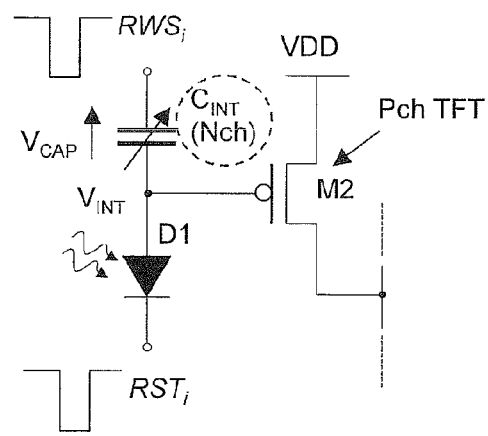
FIG. 15 is an equivalent circuit diagram of a photosensor according to Embodiment 2.
Figure 16:
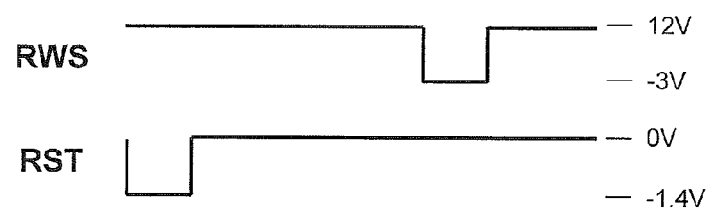
FIG. 16 is a waveform diagram of a reset signal and a readout signal supplied to the photosensor according to Embodiment 2.
Figure 17:
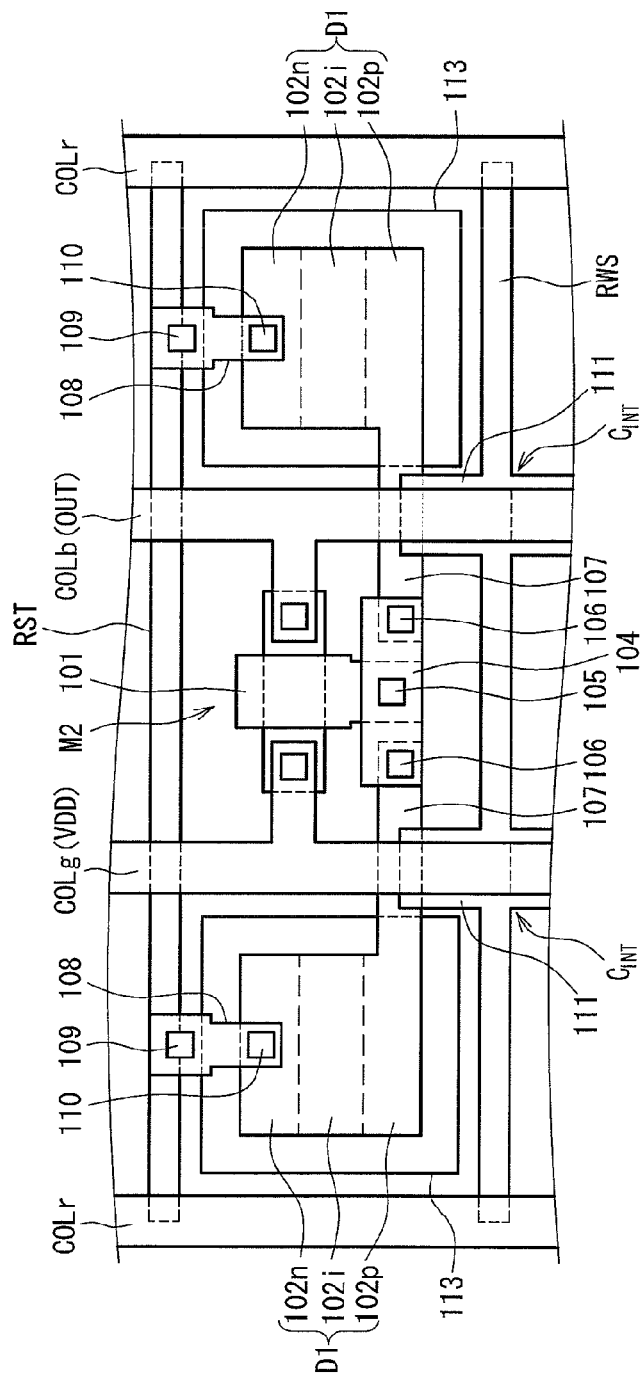
FIG. 17 is a plan view showing an example of a planar structure of the photosensor according to Embodiment 2.
Figure 18:
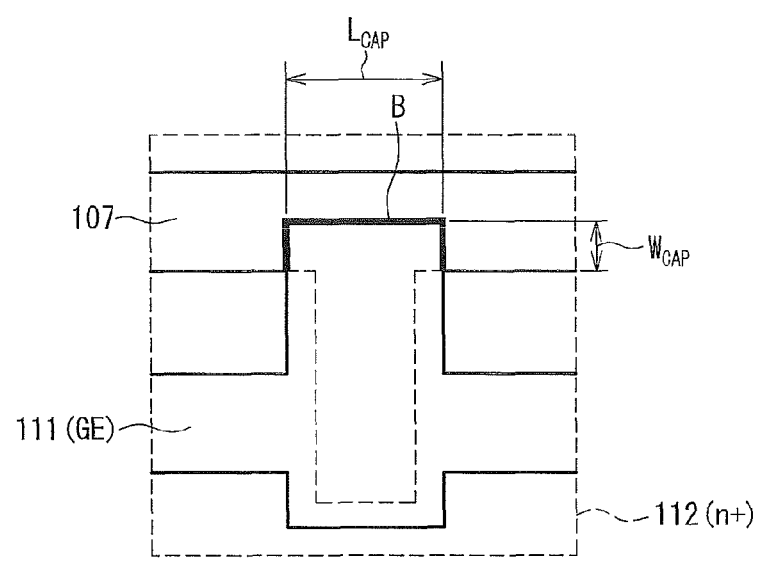
FIG. 18 is an enlarged view of a region where a capacitor C1 in FIG. 17 is formed.
Figure 19:
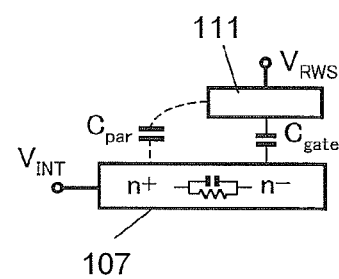
FIG. 19 is a schematic cross-sectional diagram showing connection relationships between regions in the photosensor according to Embodiment 2.

FIG. 15 is an equivalent circuit diagram of the photosensor according to the present embodiment. FIG. 16 is a waveform diagram of a reset signal and a readout signal supplied to the photosensor according to the present embodiment. FIG. 17 is a plan view showing an example of a planar structure of the photosensor according to the present embodiment. FIG. 18 is an enlarged view of a region where the capacitor C1 is formed. FIG. 19 is a schematic cross-sectional diagram showing connection relationships between regions in the photosensor according to the present embodiment.

As shown in FIG. 15, the photosensor of the present embodiment differs from Embodiment 1 in that the capacitor C1 is an n-channel MOS capacitor. Also, the photodiode D1 is connected in the direction opposite that in Embodiment 1. Specifically, the cathode of the photodiode D1 is connected to the wiring RST, and the anode is connected to the storage node INT. Furthermore, the thin-film transistor M2 for readout is a p-channel TFT. Also, as shown in FIG. 16, the high level and low level potentials of the reset signal and the readout signal are reversed from those in Embodiment 1.

As shown in FIG. 17, the photodiode D1 is a PIN diode having a lateral structure, in which the p-type semiconductor region 102p, the i-type semiconductor region 102i, and the n-type semiconductor region 102n are formed in series on a silicon film serving as the base, similarly to Embodiment 1. However, the n-type semiconductor region 102n (cathode) is connected to the wiring RST via the wiring 108 and the contacts 109 and 110. Also, the p-type semiconductor region 102p (anode) is connected to the gate electrode 101 of the thin-film transistor M2 via the extension portion 107 of the silicon film, the contacts 105 and 106, and the wiring 104.

As shown in FIGS. 18 and 19, the capacitor C1 is formed by the wide portion 111 formed in the wiring RWS, the extension portion 107 of the silicon film, and an insulating film (not shown) disposed therebetween. Specifically, the wide portion 111, which has the same potential as the wiring RWS, functions as the gate electrode of the capacitor C1. In the present embodiment, the region 112 shown in FIG. 18 is an n+ region formed by doping an n-type silicon film with n-type impurities such as phosphorus. Note that since the wide portion 111 functions as a mask when doping with the n-type impurities is performed, the extension portion 107 serves as an n+ region, and the portion of the silicon film below the wide portion 111 forms an n− region, as shown in FIG. 19.

Since potential relationship in the photosensor of the present embodiment having the above configuration is the opposite of that in Embodiment 1, the change in the potential of the storage node Vast in the integration period and the readout period is the vertical opposite of that in FIG. 9 of Embodiment 1. Accordingly, with the photosensor of the present embodiment as well, the potential difference at the storage node after the upthrust is greater than the potential difference at the storage node generated by the difference in illuminance on the light receiving face at the point in time when the integration period ends. For example, the difference between the potential of the storage node after the upthrust in the readout period in the case of the dark condition and the potential of the storage node after the upthrust in the readout period in the case where light at the saturation level has been incident is greater than the difference between the potential of the storage node at the point in time when the storage period ends in the case of the dark condition and the potential of the storage node at the point in time when the storage period ends in the case where light at the saturation level has been incident. As a result, it is possible to realize a photosensor with high sensitivity and a high S/N ratio.

Embodiment 3

The following is a description of Embodiment 3 of the present invention. Constituent elements having the same functions as constituent elements described in the above embodiments are given the same reference numerals as those in the above embodiments, and detailed descriptions thereof will be omitted.

Figure 20:
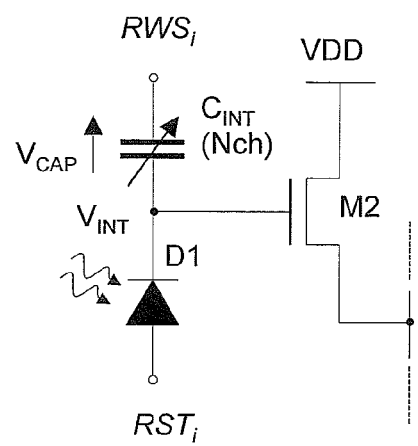
FIG. 20 is an equivalent circuit diagram of a photosensor according to Embodiment 3.
Figure 21:
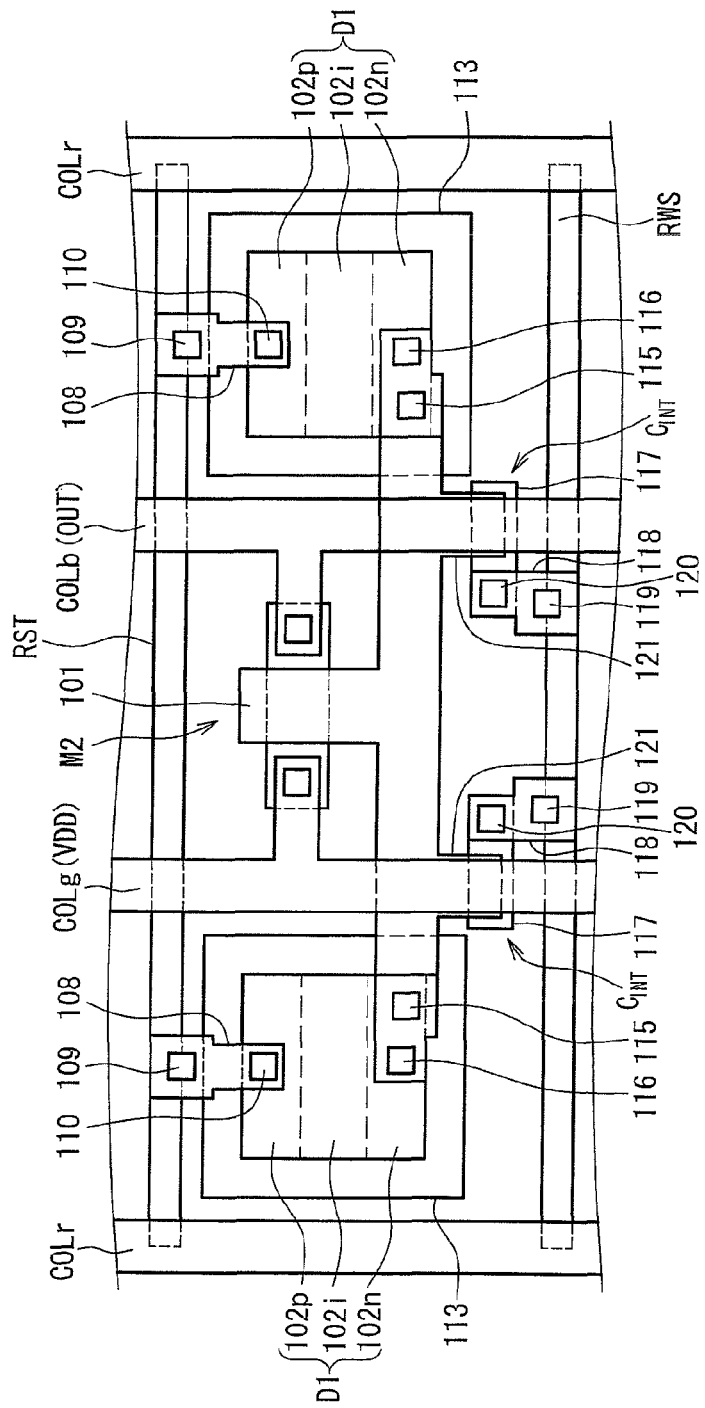
FIG. 21 is a plan view showing an example of a planar structure of the photosensor according to Embodiment 3.
Figure 22:
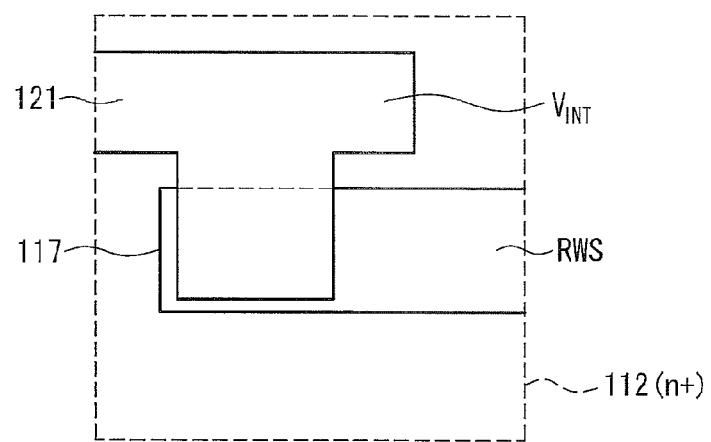
FIG. 22 is an enlarged view of a region where a capacitor C1 in FIG. 21 is formed.
Figure 23:
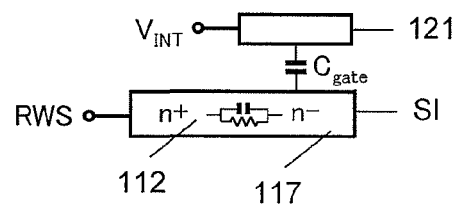
FIG. 23 is a schematic cross-sectional diagram showing connection relationships between regions in the photosensor according to Embodiment 3.

FIG. 20 is an equivalent circuit diagram of the photosensor according to the present embodiment. FIG. 21 is a plan view showing an example of a planar structure of the photosensor according to the present embodiment. FIG. 22 is an enlarged view of a region where the capacitor C1 is formed. FIG. 23 is a schematic cross-sectional diagram showing connection relationships between regions in the photosensor according to the present embodiment.

As shown in FIG. 20, the equivalent circuit diagram of the photosensor according to the present embodiment is the same as that in Embodiment 1. However, the structure of the capacitor C1 and the like is different, as shown in FIGS. 21 to 23.

As shown in FIG. 21, in the photosensor of the present embodiment, the wiring from the gate electrode 101 of the thin-film transistor M2 extends to the region above the n-type semiconductor region 102n of the photodiode D1, and is connected to the n-type semiconductor region 102n via contacts 115 and 116. The wiring from the gate electrode 101 of the thin-film transistor M2 extends to the region over the capacitor C1 as well, and functions as a gate electrode 121 of the capacitor C1.

As shown in FIGS. 22 and 23, the capacitor C1 is formed by the gate electrode 121, a silicon film 117, and an insulating film (not shown) disposed therebetween. The potential of the gate electrode 121 is the same as that of the storage node INT ($V_{INT}$). In the present embodiment, a region 112 shown in FIG. 22 is an n+ region formed by doping an n-type silicon film with n-type impurities such as phosphorus. Note that since the gate electrode 121 functions as a mask when doping with the n-type impurities is performed, the portion of the silicon film below the gate electrode 121 forms an n– region, as shown in FIG. 23.

The photosensor of the present embodiment is driven by the reset signal and the readout signal shown in FIG. 4 of Embodiment 1, and the changes in the potential of the storage node $V_{INT}$ in the integration period and the readout period are as shown in FIG. 9 of Embodiment 1. Accordingly, with the photosensor of the present embodiment as well, the potential difference of the storage node after the upthrust is greater than the potential difference of the storage node generated by the difference in illuminance on the light receiving face at the point in time when the integration period ends. For example, the difference between the potential of the storage node after the upthrust in the readout period in the case of the dark condition and the potential of the storage node after the upthrust in the readout period in the case where light at the saturation level has been incident is greater than the difference between the potential of the storage node at the point in time when the storage period ends in the case of the dark condition and the potential of the storage node at the point in time when the storage period ends in the case where light at the saturation level has been incident. As a result, it is possible to realize a photosensor with high sensitivity and a high S/N ratio.

Embodiment 4

The following is a description of Embodiment 4 of the present invention. Constituent elements having the same functions as constituent elements described in the above embodiments are given the same reference numerals as those in the above embodiments, and detailed descriptions thereof will be omitted.

Figure 24:
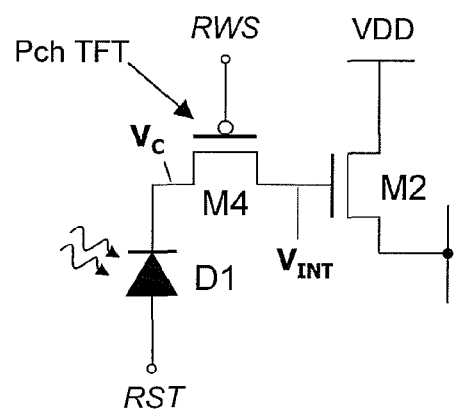
FIG. 24 is an equivalent circuit diagram of a photosensor according to Embodiment 4.
Figure 25:
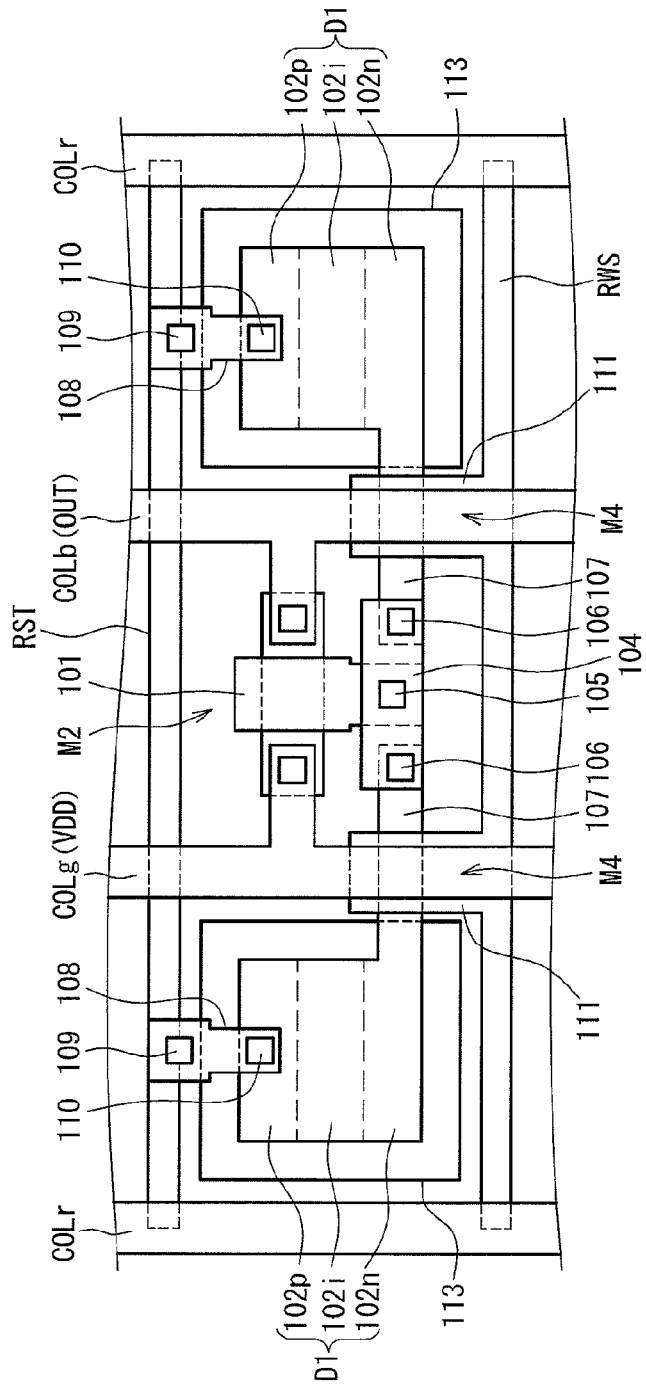
FIG. 25 is a plan view showing an example of a planar structure of the photosensor according to Embodiment 4.
Figure 26:
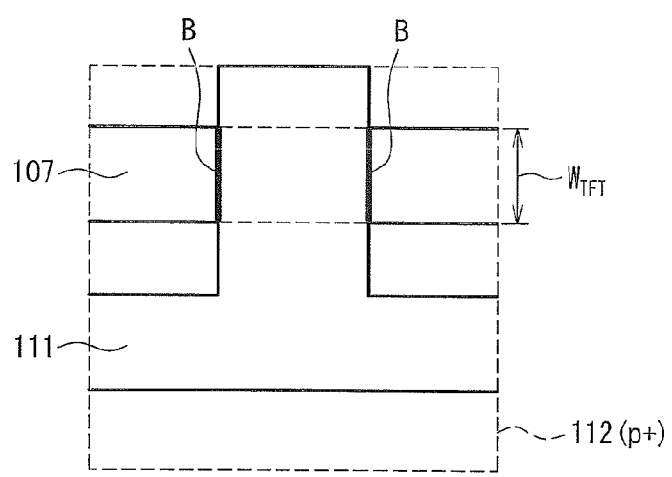
FIG. 26 is an enlarged view of a region where a p-channel TFT in FIG. 25 is formed.
Figure 27:
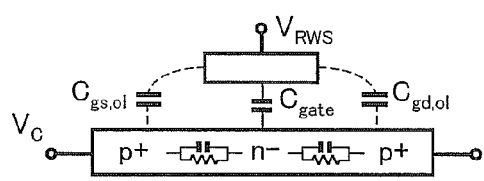
FIG. 27 is a schematic cross-sectional diagram showing connection relationships between regions in the photosensor according to Embodiment 4.
Figure 28:
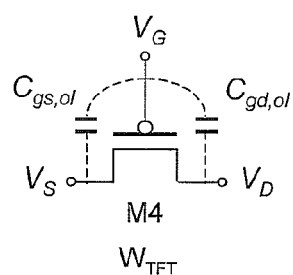
FIG. 28 is an equivalent circuit diagram of the p-channel TFT of the photosensor according to Embodiment 4.

FIG. 24 is an equivalent circuit diagram of the photosensor according to the present embodiment. FIG. 25 is a plan view showing an example of a planar structure of the photosensor according to the present embodiment. FIG. 26 is an enlarged view of a region where the amplification element (p-channel TFT) is formed. FIG. 27 is a schematic cross-sectional diagram showing connection relationships between regions in the photosensor according to the present embodiment. FIG. 28 is an equivalent circuit diagram of the p-channel TFT serving as the amplification element.

As shown in FIGS. 24 to 28, in the photosensor of the present embodiment, a p-channel TFT (thin-film transistor M4) is used as the amplification element, in place of the variable capacitor C1 described in Embodiments 1 to 3. Note that the drive signals and operations of the photosensor of the present embodiment, in which the thin-film transistor M4 is used as the amplification element, are the same as those described with reference to FIGS. 4 and 9 in Embodiment 1. Therefore, according to the photosensor of the present embodiment as well, the potential $V_{INT}$ of the storage node can be amplified when being read out.

Also, as shown in FIGS. 25 and 26, the photosensor of the present embodiment also differs from Embodiment 1 in that the wide portion 111 of the wiring RWS extends to a position at which the entire width of the wiring 107 is covered. According to this configuration, the photosensor of the present embodiment has the advantage that the boundary length is shorter than that in the photosensor of Embodiment 1.

The following describes the boundary length. "Boundary length" as used herein refers to the length of the boundary between the amplification element and the storage node INT. For example, the capacitor C1 of Embodiment 1 is formed by the overlapping of the extension portion 107 of the silicon film and the wide portion 111 of the wiring RWS, as shown in FIGS. 6 and 7. Accordingly, in Embodiment 1, as shown in FIG. 7, the boundary between the amplification element and the storage node INT is the portion where the outer edges of the wide portion 111 of the wiring RWS overlaps with the extension portion 107 of the silicon film, as shown by the bold line B. Specifically, in Embodiment 1, the boundary length is the sum of a length $L_{CAP}$ shown in FIG. 7 and the value of $2 \times W_{CAP}$. Also, since the area where the wide portion 111 of the wiring RWS and the extension portion 107 of the silicon film overlap functions as the amplification element in the photosensor of the present embodiment, the boundary length is double a width $W_{TFT}$ of the amplification element (i.e., the width of the extension portion 107), as shown in FIG. 26.

In Embodiment 1, if an attempt to shorten the boundary length is made, the length $L_{CAP}$ needs to be reduced, and the layout area of the capacitor C1 ends up being increased in order to ensure a capacitance of the capacitor C1. However, since the boundary length is the width $W_{TFT}$ of the extension portion 107 of the silicon film in Embodiment 4, the boundary length can be shortened without increasing the layout area.

Figure 29:
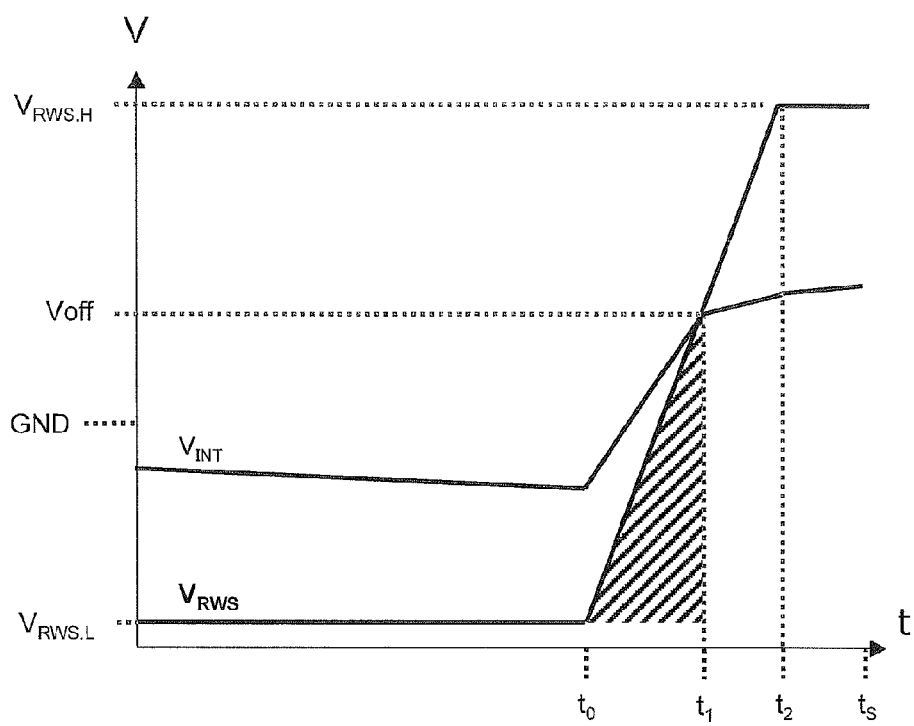
FIG. 29 is a waveform diagram showing effects that a parasitic capacitance and leakage current exert on the potential of a storage node.

The following describes the reason why a shorter boundary length is better, with reference to FIGS. 9 and 29. As described with reference to FIG. 9 in Embodiment 1, the threshold voltage $V_{off}$ exists between the low level $V_{RWS,L}$ and the high level $V_{RWS,H}$ of the readout signal supplied from the wiring RWS along its rising slope. At this point, it is preferable that the potential $V_{INT}$ of the storage node is constant from after the readout signal of the wiring RWS has reached the threshold voltage $V_{off}$ at the time $t_1$, until the sampling time $t_S$. However, as shown in FIG. 29, the potential $V_{INT}$ of the storage node continues to rise in the period from time $t_1$ to time $t_2$ in which the readout signal rises, due to the parasitic capacitance between the amplification element and the storage node. Also, the potential $V_{INT}$ of the storage node continues to rise in the period from the time $t_2$, at which the potential of the readout signal reached the high level $V_{RWS,H}$, to the sampling time $t_S$ as well, due to leakage current. In this way, the rise in the potential $V_{INT}$ of the storage node from the time $t_1$ onward is not preferable since the potential amplification effect is reduced. It is preferable to shorten the boundary length of the amplification element in order to suppress the rise in the potential $V_{INT}$ attributed to the parasitic capacitance and leakage current from the time $t_1$ onward.

Accordingly, the photosensor of Embodiment 4 has an advantage over the photosensor of Embodiment 1 in that since the boundary length of the amplification element is shorter, it is possible to suppress the rise in the potential $V_{INT}$ attributed to the parasitic capacitance and leakage current from the time $t_1$ onward.

Figure 30:
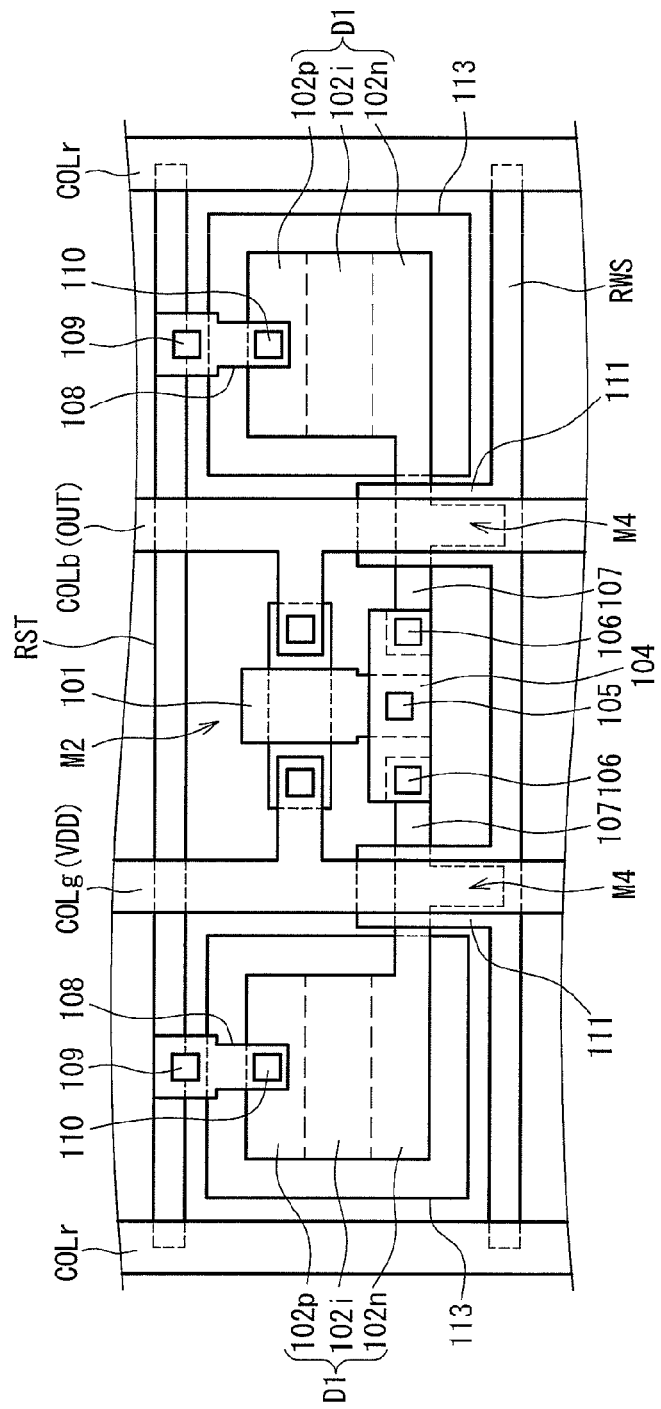
FIG. 30 is a plan view showing an example of a planar structure of a variation of the photosensor according to Embodiment 4.
Figure 31:
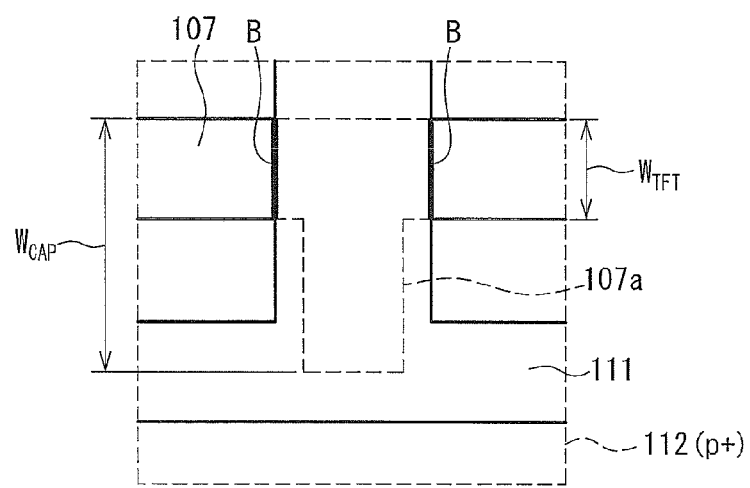
FIG. 31 is an enlarged view of a region where a p-channel TFT in FIG. 30 is formed.
Figure 32:
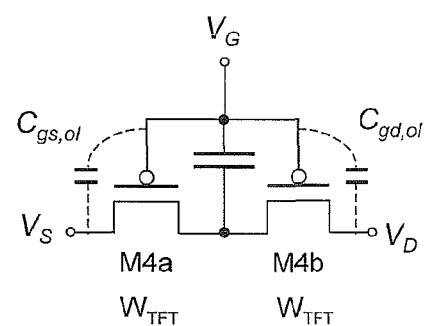
FIG. 32 is an equivalent circuit diagram of the p-channel TFT in FIG. 30.

Also, as a variation of the photosensor of Embodiment 4, a configuration is possible in which the boundary length $W_{TFT}$ is further shortened while ensuring the effective area of the amplification element through a configuration in which, as shown in FIGS. 30 and 31, the width of the extension portion 107 of the silicon film is shortened, and the extension portion 107 is provided with a wide portion 107a for ensuring the width $W_{CAP}$ of the amplification element. FIG. 32 shows an equivalent circuit diagram of the p-channel TFT serving as the amplification element in this case. According to the configuration of this variation, the boundary length can be shortened to a greater extent than in the configuration shown in FIGS. 24 to 28, thus enabling further suppressing the rise in the potential $V_{INT}$ attributed to the parasitic capacitance and leakage current from the time $t_1$ onward. This enables realizing a photosensor with an even wider dynamic range.

Embodiment 5

The following is a description of Embodiment 5 of the present invention. Constituent elements having the same functions as constituent elements described in the above embodiments are given the same reference numerals as those in the above embodiments, and detailed descriptions thereof will be omitted.

Figure 33:
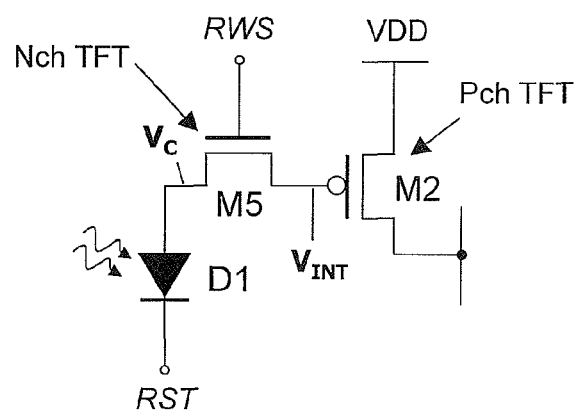
FIG. 33 is an equivalent circuit diagram of a photosensor according to Embodiment 5.
Figure 34:
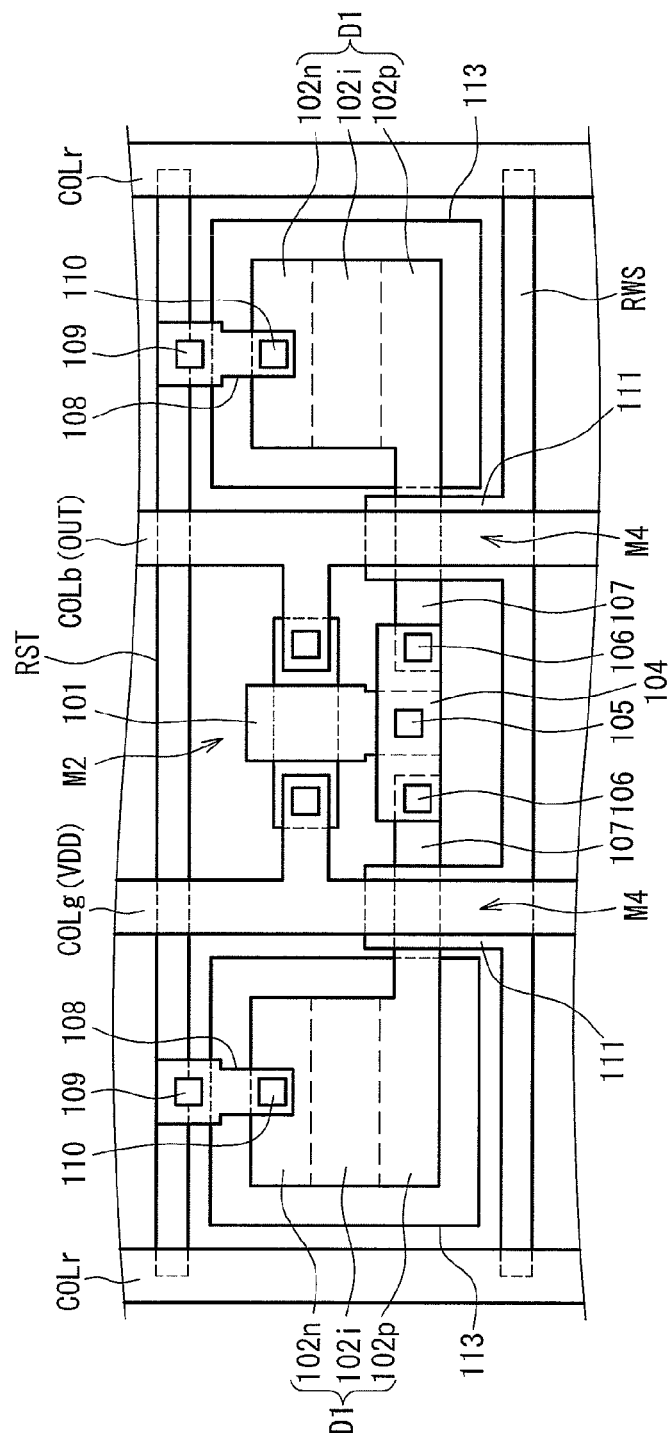
FIG. 34 is a plan view showing an example of a planar structure of the photosensor according to Embodiment 5.
Figure 35:
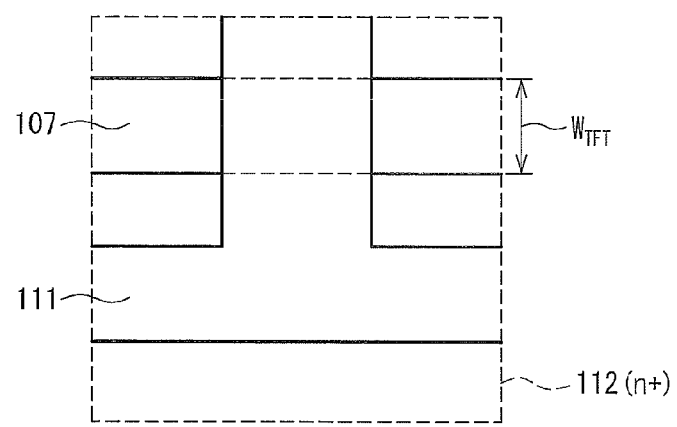
FIG. 35 is an enlarged view of a region where an amplification element (n-channel TFT) is formed in Embodiment 5.
Figure 36:
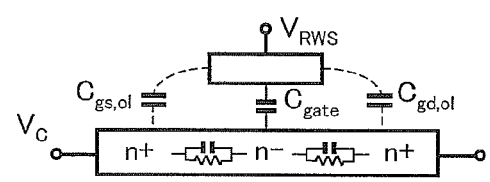
FIG. 36 is a schematic cross-sectional diagram showing connection relationships between regions in the photosensor according to Embodiment 5.
Figure 37:
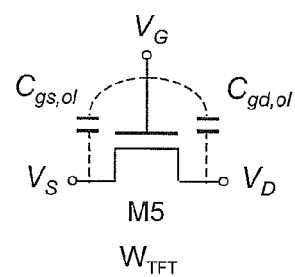
FIG. 37 is an equivalent circuit diagram of the n-channel TFT serving as the amplification element according to Embodiment 5.

FIG. 33 is an equivalent circuit diagram of the photosensor according to the present embodiment. FIG. 34 is a plan view showing an example of a planar structure of the photosensor according to the present embodiment. FIG. 35 is an enlarged view of a region where an amplification element (n-channel TFT) is formed. FIG. 36 is a schematic cross-sectional diagram showing connection relationships between regions in the photosensor according to the present embodiment. FIG. 37 is an equivalent circuit diagram of the n-channel TFT serving as the amplification element.

In the photosensor of the present embodiment, an n-channel TFT (thin-film transistor M4) is used as the amplification element, in place of the n-channel MOS capacitor described in Embodiment 2. Note that the drive signals of the photosensor of the present embodiment, in which an n-channel TFT is used as the amplification element, have high level and low level potentials that are reversed from those of the drive signals in Embodiment 4, in which an n-channel TFT is used as the amplification element, as described in Embodiment 2 with reference to FIG. 16. Based on such drive signals, with the photosensor of the present embodiment, the potential $V_{INT}$ of the storage node can be amplified when being read out, as described with reference to FIG. 9 in Embodiment 1.

As shown in FIGS. 33 and 34, the photodiode D1 of the photosensor of the present embodiment is connected in the direction opposite that in Embodiment 4. Specifically, the cathode of the photodiode D1 is connected to the wiring RST, and is connected to the n-channel TFT. Furthermore, the thin-film transistor M2 for readout is a p-channel TFT.

As shown in FIGS. 34 and 35, the photosensor of the present embodiment differs from Embodiment 2 in that the wide portion 111 of the wiring RWS extends to a position at which the entire width of the wiring 107 is covered. As described in the above contrast with Embodiment 1 in Embodiment 4, the photosensor of the present embodiment has the advantage that the boundary length is shorter than that in the photosensor of Embodiment 2. Specifically, the boundary length of the photosensor of Embodiment 2 is $L_{CAP}+2\times W_{CAP}$ as shown in FIG. 18. In contrast, the boundary length of the photosensor of the present embodiment is the width $W_{TFT}$ of the extension portion 107 as shown in FIG. 35.

In Embodiment 2, if an attempt to shorten the boundary length is made, the length $L_{CAP}$ needs to be reduced, and the layout area of the capacitor C1 ends up being increased in order to ensure the capacitance of the capacitor C1. However, since the boundary length is double the width $W_{TFT}$ of the extension portion 107 of the silicon film in the present embodiment, the boundary length can be shortened without increasing the layout area. Accordingly, the photosensor of the present embodiment has an advantage over the photosensor of Embodiment 2 in that since the boundary length of the amplification element is shorter, it is possible to suppress the rise in the potential $V_{INT}$ attributed to the parasitic capacitance and leakage current from the time $t_1$ onward.

Figure 38:
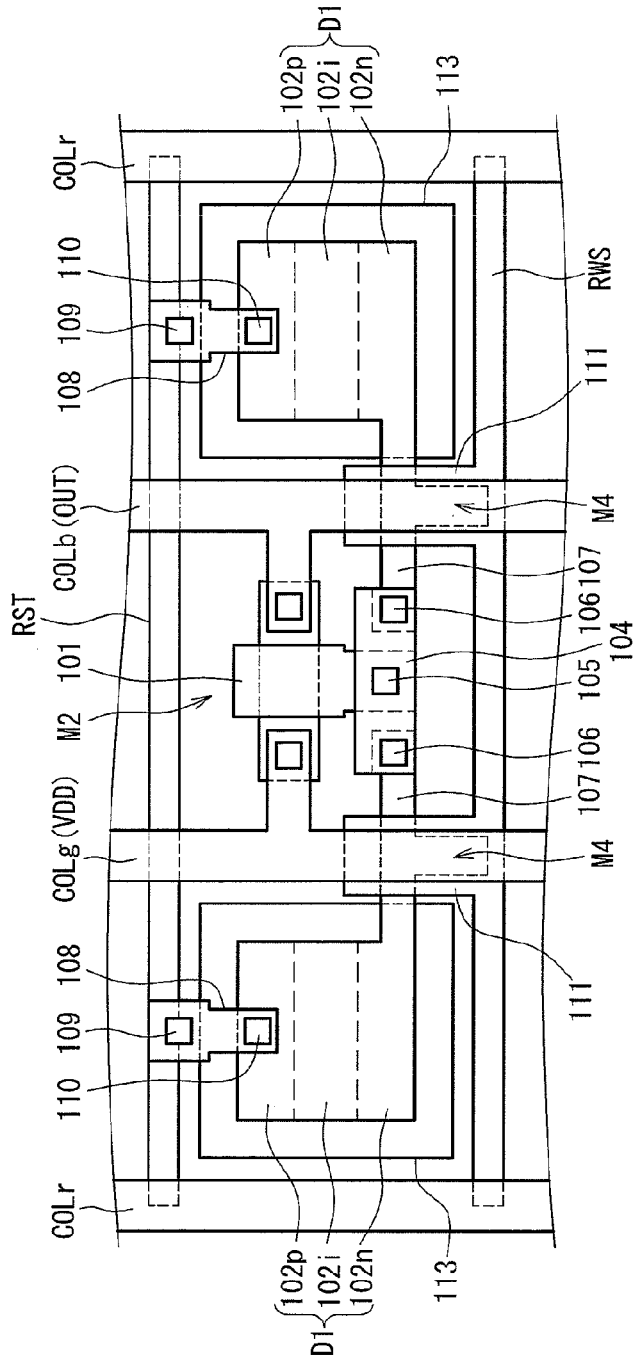
FIG. 38 is a plan view showing an example of a planar structure of a variation of the photosensor according to Embodiment 5.
Figure 39:
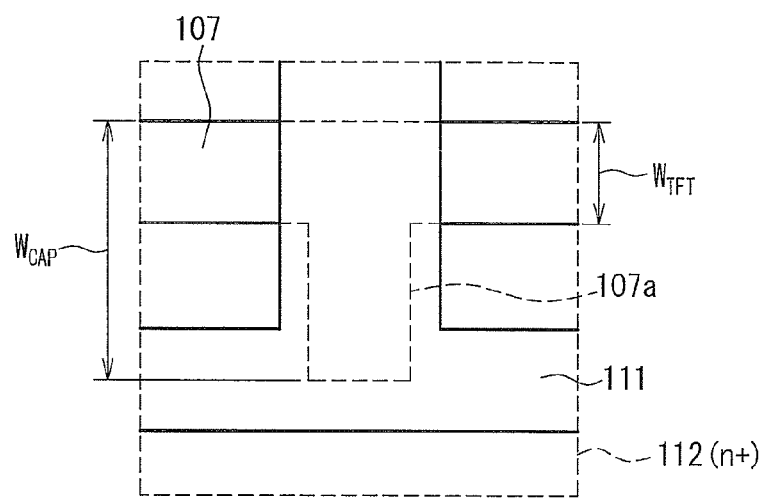
FIG. 39 is a schematic cross-sectional diagram showing connection relationships between regions in an amplification element in the variation in FIG. 38.
Figure 40:
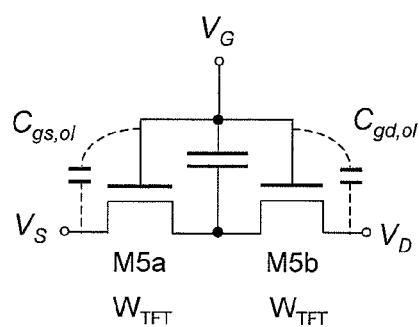
FIG. 40 is an equivalent circuit diagram of an n-channel TFT in FIG. 39.

Also, as a variation of the photosensor of Embodiment 5, a configuration is possible in which $W_{TFT}$ is further shortened without increasing the layout area, while also ensuring an effective area of the amplification element, through a configuration in which, as shown in FIGS. 38 and 39, the width of the extension portion 107 of the silicon film is shortened, and the extension portion 107 is provided with the wide portion 107a. FIG. 40 shows an equivalent circuit diagram of the n-channel TFT serving as the amplification element in this case. According to the configuration of this variation, the boundary length can be shortened to a greater extent than in the configuration shown in FIGS. 33 to 37, thus enabling further suppressing the rise in the potential $V_{INT}$ attributed to the parasitic capacitance and leakage current from the time $t_1$ onward. This enables realizing a photosensor with an even wider dynamic range.

Embodiment 6

The following is a description of Embodiment 6 of the present invention. Constituent elements having the same functions as constituent elements described in the above embodiments are given the same reference numerals as those in the above embodiments, and detailed descriptions thereof will be omitted.

Figure 41:
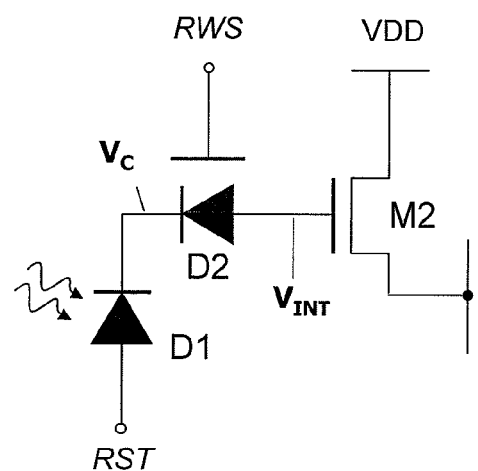
FIG. 41 is an equivalent circuit diagram of a photosensor according to Embodiment 6.
Figure 42:
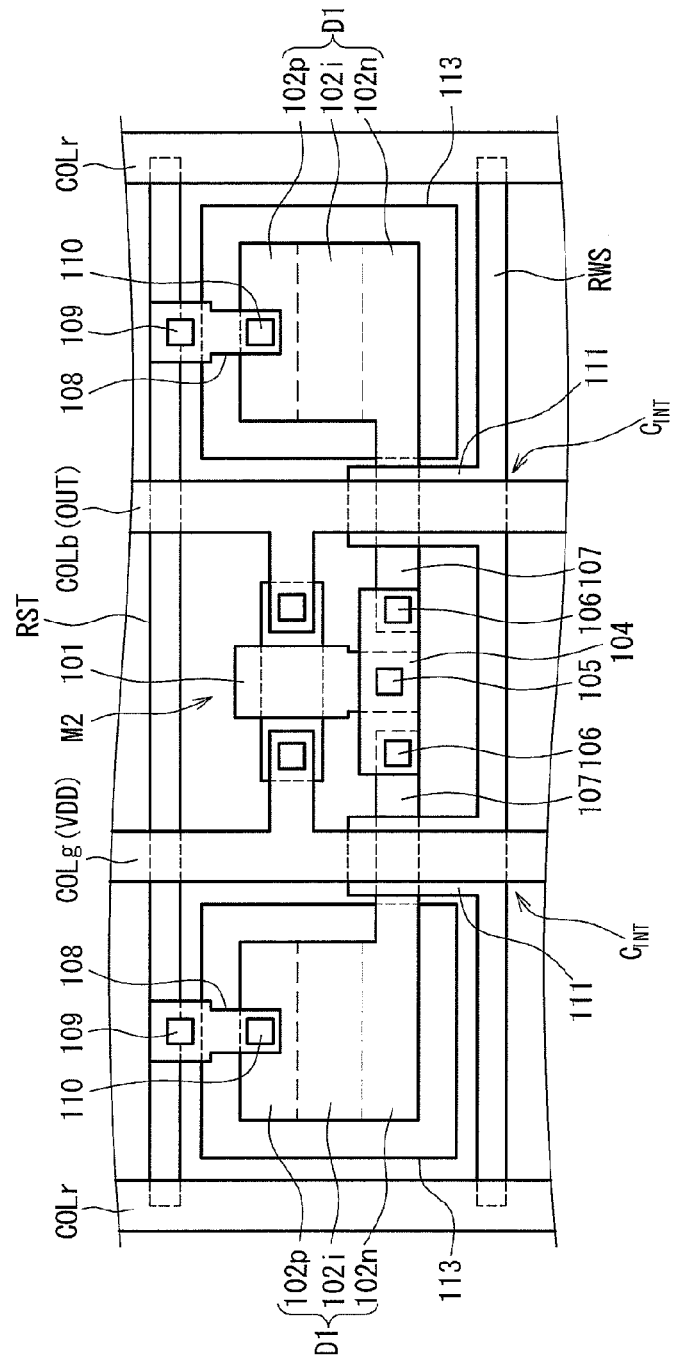
FIG. 42 is a plan view showing an example of a planar structure of the photosensor according to Embodiment 6.
Figure 43:
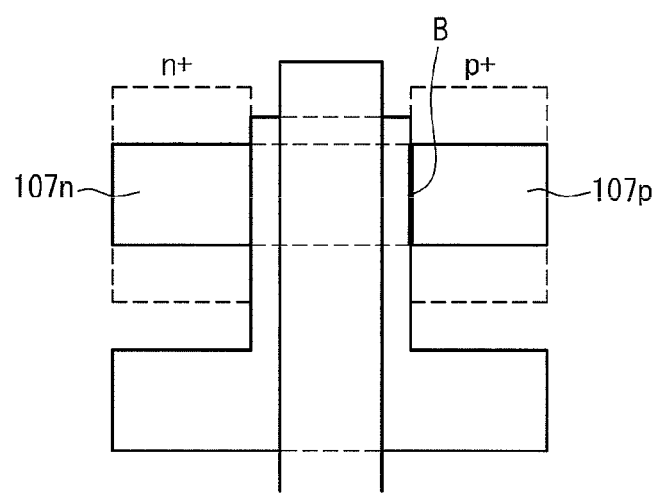
FIG. 43 is an enlarged view of a region where an amplification element (photodiode D2) is formed in Embodiment 6.
Figure 44:
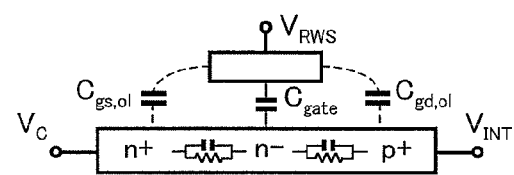
FIG. 44 is a schematic cross-sectional diagram showing connection relationships between regions in the photosensor according to Embodiment 6.
Figure 45:
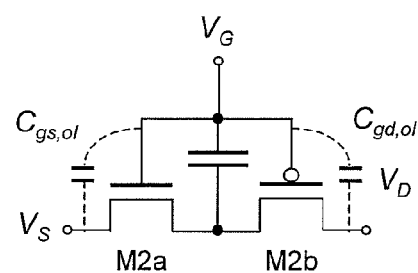
FIG. 45 is an equivalent circuit diagram of a photodiode serving as the amplification element according to Embodiment 6.

FIG. 41 is an equivalent circuit diagram of the photosensor according to the present embodiment. FIG. 42 is a plan view showing an example of a planar structure of the photosensor according to the present embodiment. FIG. 43 is an enlarged view of a region where an amplification element (photodiode D2) is formed. FIG. 44 is a schematic cross-sectional diagram showing connection relationships between regions in the photosensor according to the present embodiment. FIG. 45 is an equivalent circuit diagram of the photodiode serving as the amplification element.

The photosensor of the present embodiment differs from the above embodiments in that a photodiode D2 is used as the amplification element. Note that the photodiode D2 used here is a photodiode including a gate electrode over the channel. Due to providing the gate electrode over the channel region in the photodiode D2, an upthrust occurs in the readout period due to the capacitance between the gate and the photodiode. As shown in FIG. 41, the photosensor of the present embodiment has the photodiode D2 that functions as an amplification element. As shown in FIGS. 41 to 43, the cathode (n-type semiconductor region 107n) of the photodiode D2 is connected to the cathode (n-type semiconductor region 102n) of the photodiode D1, and the anode (p-type semiconductor region 107p) of the photodiode D2 is connected to the storage node INT.

In this configuration as well, applying the reset signal and the readout signal shown in FIG. 4 in Embodiment 1 enables the potential $V_{INT}$ of the storage node to be amplified when being read out, as shown in FIG. 9 in Embodiment 1.

Also, the configuration of the present embodiment has the following two advantages over a configuration in which a p-channel TFT is used as the amplification element, such as in Embodiment 4.

The first advantage is that the boundary length is even shorter. Specifically, in the photosensor of the present embodiment, a boundary B exists only on the p+ region side as shown in FIG. 43, and therefore the boundary length is the width $W_{TFT}$ of the extension portion 107 of the silicon film. Accordingly, there is an advantage over the photosensor of Embodiment 4 in that the rise in the potential $V_{TFT}$ attributed to the parasitic capacitance and leakage current from the time $t_1$ onward can be even further reduced.

The second advantage is that since the cathode (n-type semiconductor region 102n) of the photodiode D1 and the cathode (n-type semiconductor region 107n) of the photodiode D2 are connected, the connection is simpler than that in Embodiment 4, in which the cathode (n-type semiconductor region 102n) of the photodiode D1 is connected to a p-type semiconductor region.

Figure 46:
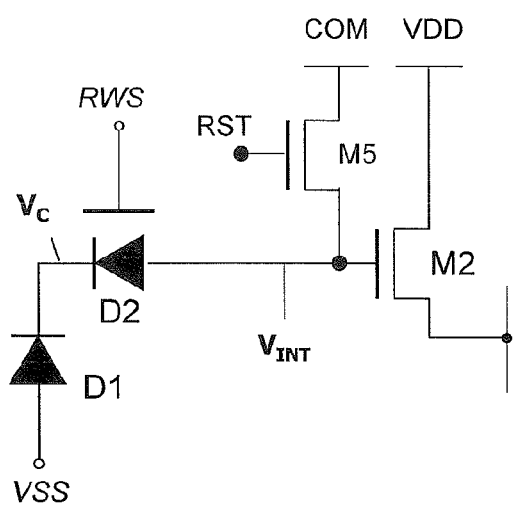
FIG. 46 is an equivalent circuit diagram of a photosensor according a first variation of Embodiment 6.
Figure 47:
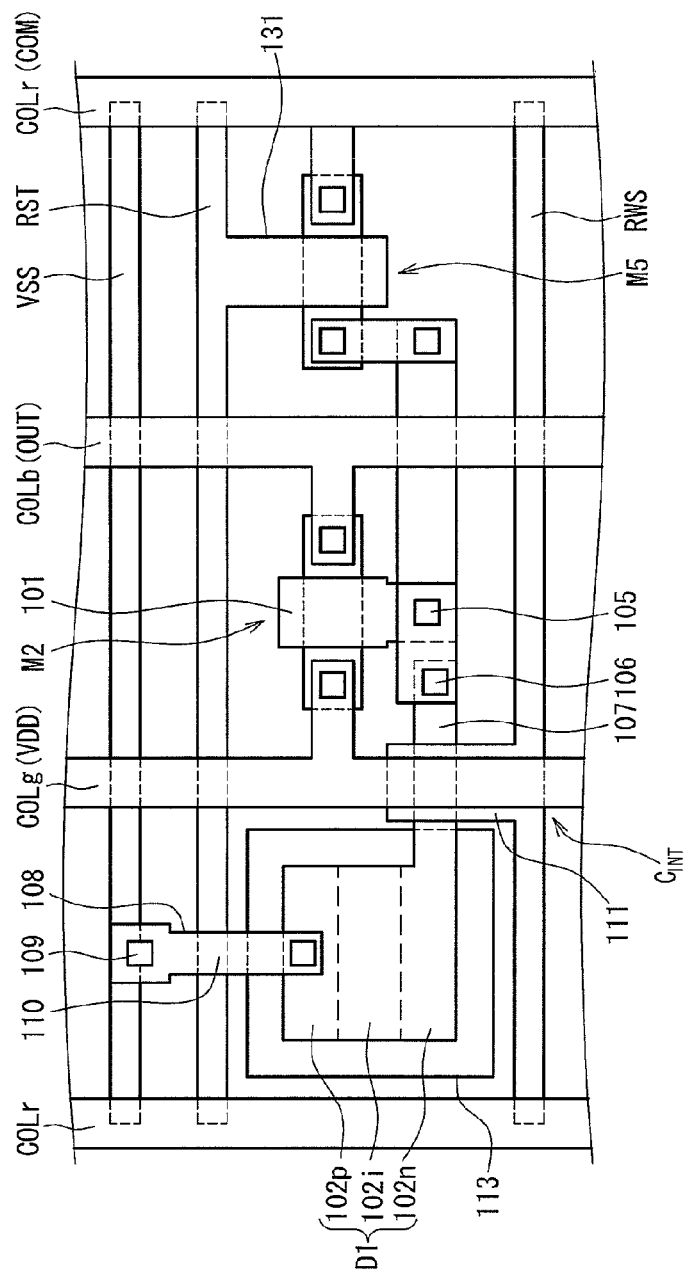
FIG. 47 is a plan view showing an example of a planar structure of the photosensor according to the first variation of Embodiment 6.

Note that a configuration such as that shown in FIGS. 46 and 47 may be employed as a variation of the configuration shown in FIGS. 41 and 42. FIG. 46 is an equivalent circuit diagram of a photosensor according to a first variation of the present embodiment. FIG. 47 is a plan view showing an example of a planar structure of the photosensor according to the first variation. As shown in FIGS. 46 and 47, the photosensor of the first variation of the present embodiment has a configuration including an additional thin-film transistor M5 for resetting.

The anode (p-type semiconductor region 102p) of the photodiode D1 is connected to the wiring VSS, which supplies a predetermined DC potential, via the wiring 108 and the contacts 109 and 110. A gate electrode 131 of the thin-film transistor M3 for resetting extends out from the wiring RST. According to the configuration of the first variation, the storage node can be more reliably reset using the thin-film transistor M3 for resetting that is connected to the storage node INT, which is an advantage over a configuration in which resetting is performed via the photodiode D2 as shown in FIGS. 41 and 42.

Figure 48:
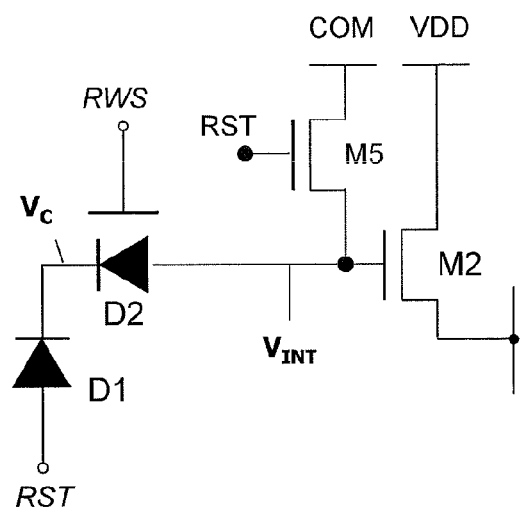
FIG. 48 is an equivalent circuit diagram of a photosensor according a second variation of Embodiment 6.
Figure 49:
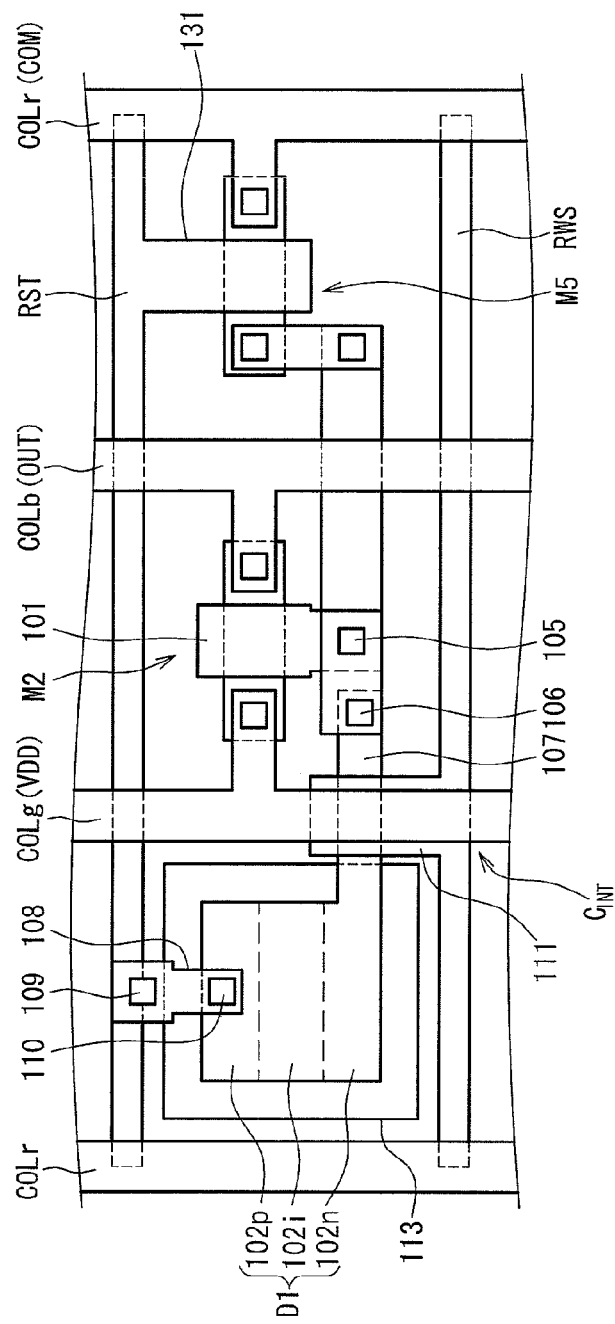
FIG. 49 is a plan view showing an example of a planar structure of the photosensor according to the second variation of Embodiment 6.

A configuration such as that shown in FIGS. 48 and 49 can also be employed as a second variation. FIG. 48 is an equivalent circuit diagram of a photosensor according to the second variation of the present embodiment. FIG. 49 is a plan view showing an example of a planar structure of the photosensor according to the second variation. The configuration shown in FIGS. 48 and 49 differs from the first variation in that the anode (p-type semiconductor region 102p) of the photodiode D1 is connected to the wiring RST that supplies the reset signal. This configuration eliminates the need to separately provide the wiring VSS, thus having an advantage over the first variation in that the layout area of the photosensor can be reduced.

Embodiment 7

The following is a description of Embodiment 7 of the present invention. Constituent elements having the same functions as constituent elements described in the above embodiments are given the same reference numerals as those in the above embodiments, and detailed descriptions thereof will be omitted.

Figure 50:
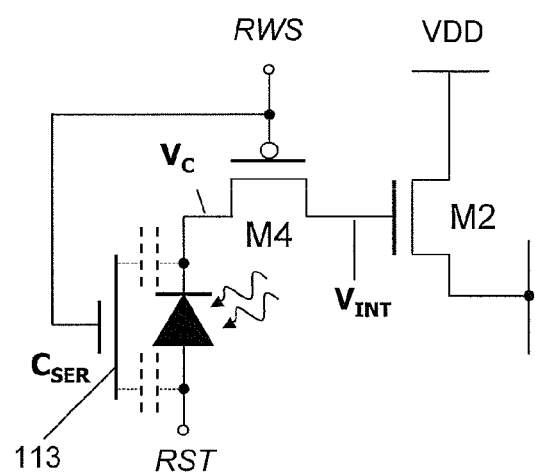
FIG. 50 is an equivalent circuit diagram of a photosensor according to Embodiment 7.
Figure 51:
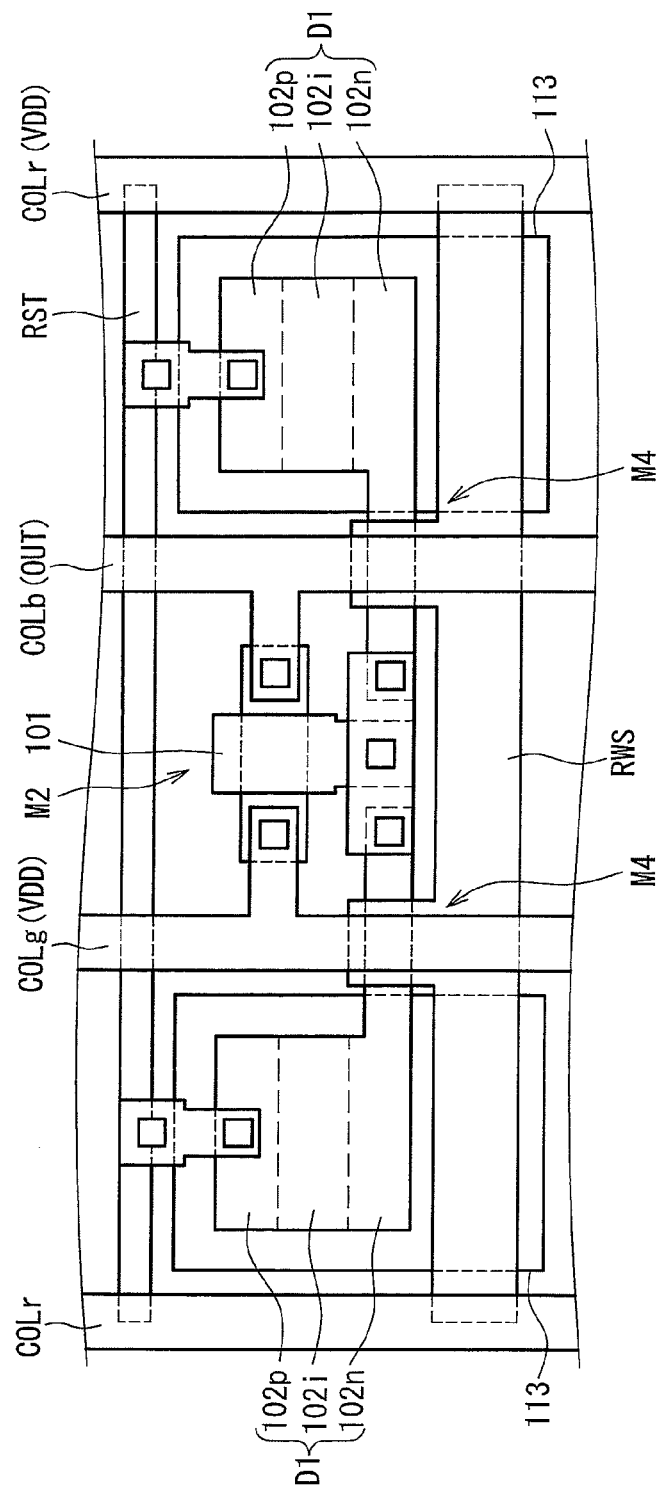
FIG. 51 is a plan view showing an example of a planar structure of the photosensor according to the embodiment.

FIG. 50 is an equivalent circuit diagram of the photosensor according to the present embodiment. FIG. 51 is a plan view showing an example of a planar structure of the photosensor according to the present embodiment.

The photosensor of the present embodiment has the configuration shown in FIGS. 30 to 32 in Embodiment 4, in which the light shielding film 113 provided on the back face of the photodiode D1 has been extended to a position opposing the wiring RWS, and a capacitor $C_{SER}$ is formed by the light shielding film 113, the wiring RWS, and an insulating film (not shown) therebetween, as shown in FIGS. 50 and 51. In other words, the photosensor of the present embodiment uses a p-channel TFT (thin film transistor M4) as the amplification element, similarly to Embodiment 4.

In the configuration shown in FIG. 50, the capacitor $C_{SER}$ functions as a series capacitor in series with capacitors Cc and Ca between the light shielding film 113 and the photodiode D1. This enables increasing only $C_{INT}$, without increasing $C_{INT}'$, in Equation (6) described in Embodiment 1, thus enabling improving the amplification effect during readout.

Note that the effect of improving the amplification effect during readout by providing the capacitor $C_{SER}$ in this way is more significant in a configuration using a p-channel TFT as the amplification element as in the present embodiment, compared to a configuration in which a variable capacitor is used as the amplification element.

Figure 52A:
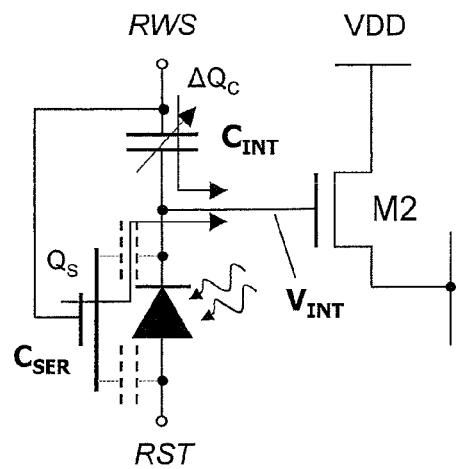
FIG. 52A is a circuit diagram showing how charge is injected in the case of combining a series capacitor $C_{SER}$ with a configuration in which the amplification element is a variable capacitor.

Specifically, in the case where the capacitor $C_{SER}$ is combined with the configuration using the variable capacitor C1 as the amplification element (Embodiment 1), as shown in FIG. 52A, the potential $V_{INT}$ of the storage node during readout is influenced by not only a charge $\Delta Q_C$ from the capacitor C1, but also a charge $Q_S$ injected from the capacitor $C_{SER}$. Accordingly, in this configuration, the existence of the capacitor $C_{SER}$ reduces the amplification effect during readout.

Figure 52B:
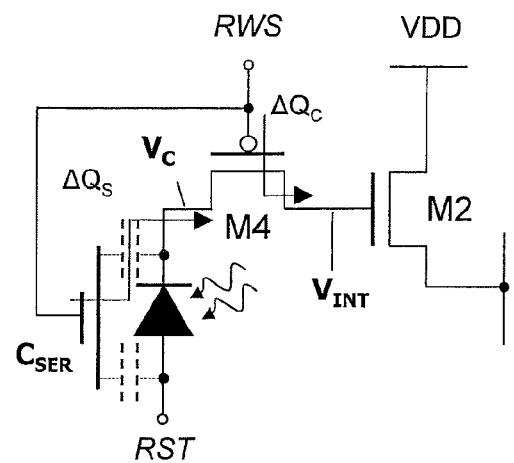
FIG. 52B is a circuit diagram showing how charge is injected in the case of combining the series capacitor $C_{SER}$ with a configuration in which the amplification element is a p-channel TFT.

On the other hand, in the case of combining the capacitor $_{SER}$ with a configuration using a p-channel TFT (thin-film transistor M4) as the amplification element as in the present embodiment, as shown in FIG. 52B, the charge injected from the capacitor $C_{SER}$ also needs to pass through the thin-film transistor M4 during readout. Accordingly, the charge injected from the capacitor $C_{SER}$ ($\Delta Q_S$) also has the effect of improving the amplification effect, along with the charge $\Delta Q_C$.

Accordingly, a photosensor in which the capacitor $C_{SER}$ is combined with a configuration using a p-channel TFT as the amplification element, as in the present embodiment, is effective in terms of obtaining a high amplification effect.

Note that although the example of combining the capacitor $C_{SER}$ with the configuration shown in FIGS. 30 to 32 in Embodiment 4 is described above, similar effects can be obtained by combining the capacitor $C_{SER}$ with other configurations described in Embodiments 4 and 5 as well.

Embodiment 8

The following is a description of Embodiment 8 of the present invention. Constituent elements having the same functions as constituent elements described in the above embodiments are given the same reference numerals as those in the above embodiments, and detailed descriptions thereof will be omitted.

Figure 53:
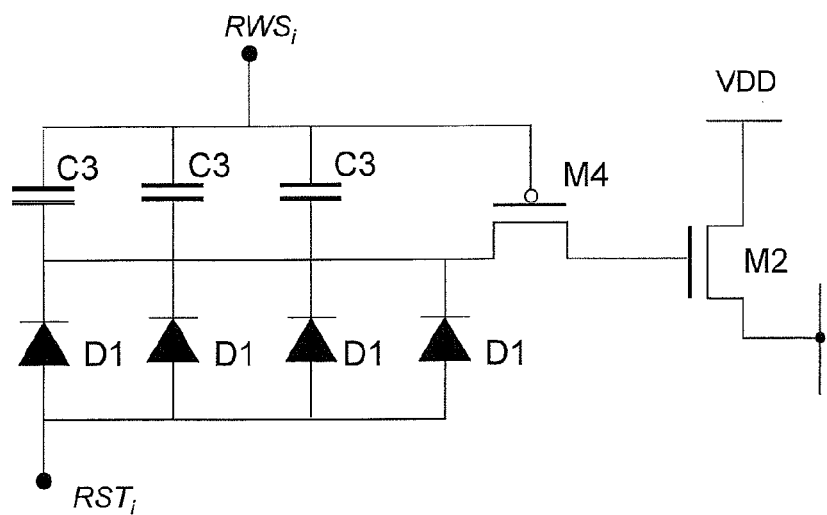
FIG. 53 is an equivalent circuit diagram of a photosensor according to Embodiment 8.
Figure 54:
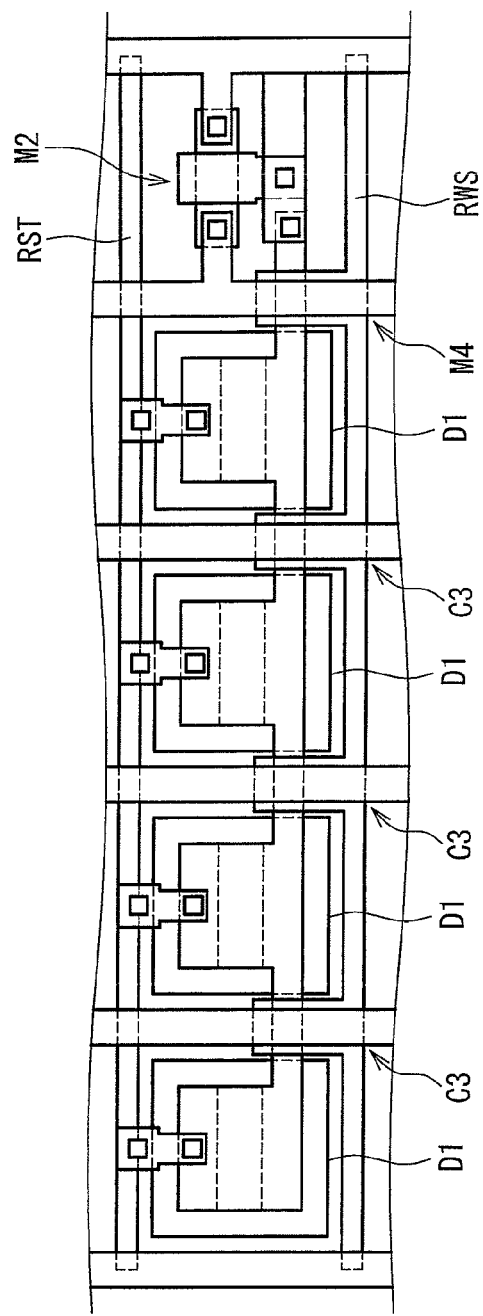
FIG. 54 is a plan view showing an example of a planar structure of the photosensor according to Embodiment 8.

FIG. 53 is an equivalent circuit diagram of the photosensor according to the present embodiment. FIG. 54 is a plan view showing an example of a planar structure of the photosensor according to the present embodiment. As shown in FIGS. 53 and 54, with the photosensor of the present embodiment, photodiodes D1 and capacitors C3 are formed in parallel across a plurality of pixel regions. Each capacitor C3 is a normal (not variable) capacitor. Note that although the example of a configuration in which one thin-film transistor M2 for readout is used to read out four photodiodes D1 is shown in FIGS. 53 and 54, the number of photodiodes D1 to be read out is not limited to this.

In the example shown in FIGS. 53 and 54, the p-channel Tyr (thin-film transistor M4) in the pixel region closest to the transistor M2 for readout is formed as an amplification element, and a normal (not variable) capacitor C3 is formed in the other pixel regions.

According to this configuration, the photocurrent can be increased by connecting multiple photodiodes D1 in parallel.

Also, disposing the amplification element in the region including the photodiode D1 closest to the thin-film transistor M2 for readout enables the potential of the storage node to be amplified when being read out. This enables realizing a highly sensitive photosensor without deterioration of the S/N ratio. Also, using a p-channel TFT as the amplification element enables setting the boundary length shorter than in the case of using a variable capacitor, as previously described. This enables further improving the amplification effect.

Embodiment 9

The following is a description of Embodiment 9 of the present invention. Constituent elements having the same functions as constituent elements described in the above embodiments are given the same reference numerals as those in the above embodiments, and detailed descriptions thereof will be omitted.

Figure 55:
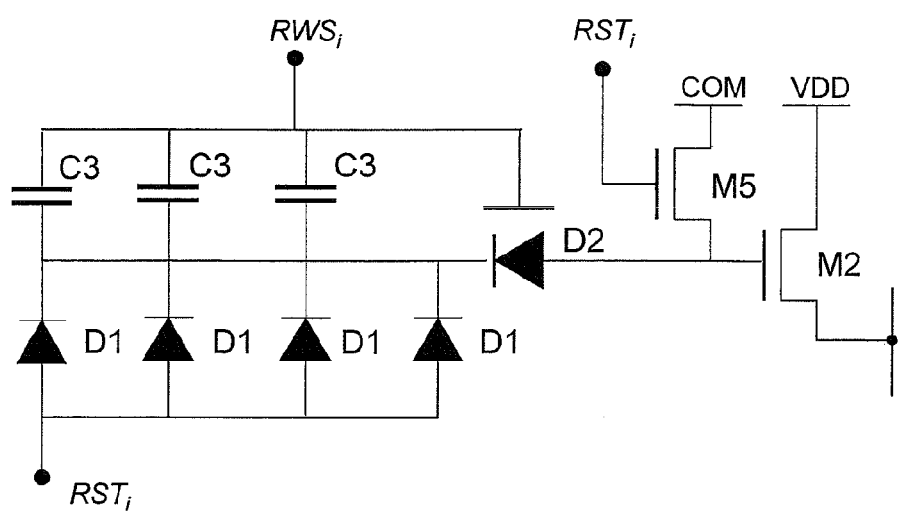
FIG. 55 is an equivalent circuit diagram of a photosensor according to Embodiment 9.
Figure 56:
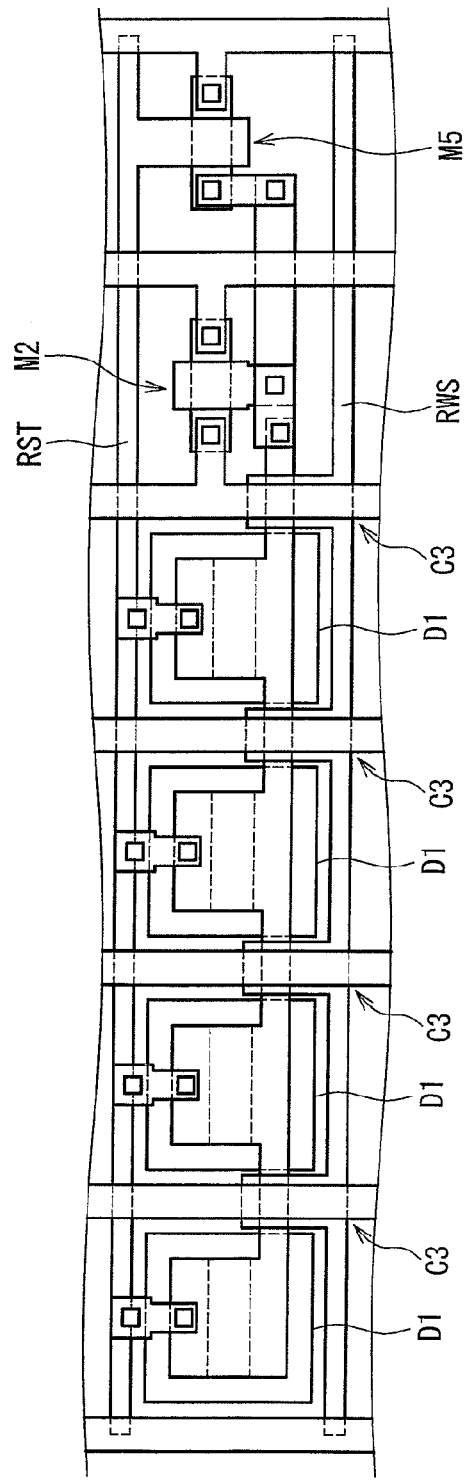
FIG. 56 is a plan view showing an example of a planar structure of the photosensor according to Embodiment 9.

FIG. 55 is an equivalent circuit diagram of the photosensor according to the present embodiment. FIG. 56 is a plan view showing an example of a planar structure of the photosensor according to the present embodiment. As shown in FIGS. 55 and 56, with the photosensor of the present embodiment, photodiodes D1 and capacitors C3 are formed in parallel across a plurality of pixel regions. Each capacitor C3 is a normal (not variable) capacitor. Note that although the example of a configuration in which one thin-film transistor M2 for readout is used to read out four photodiodes D1 is shown in FIGS. 55 and 56, the number of photodiodes D1 to be read out is not limited to this.

In the example shown in FIGS. 55 and 56, a photodiode D2 is provided as an amplification element in the pixel region including, among the four photodiodes D1, the photodiode D1 closest to the thin-film transistor M2 for readout, and the normal (not variable) capacitors C3 are formed in the other pixel regions. Also, a thin-film transistor M5 for resetting is formed in the pixel region adjacent to the thin-film transistor M2 for readout.

According to this configuration, the photocurrent can be increased by connecting multiple photodiodes D1 in parallel. Also, disposing the amplification element (photodiode D2) in the region including the photodiode D1 closest to the thin-film transistor M2 for readout enables the potential of the storage node to be amplified when being read out. This enables realizing a highly sensitive photosensor without deterioration of the S/N ratio. Also, using the photodiode D2 as the amplification element enables setting the boundary length shorter than in the case of using a variable capacitor, as previously described. This enables further improving the amplification effect.

Embodiment 10

The following is a description of Embodiment 10 of the present invention. Constituent elements having the same functions as constituent elements described in the above embodiments are given the same reference numerals as those in the above embodiments, and detailed descriptions thereof will be omitted.

Figure 57:
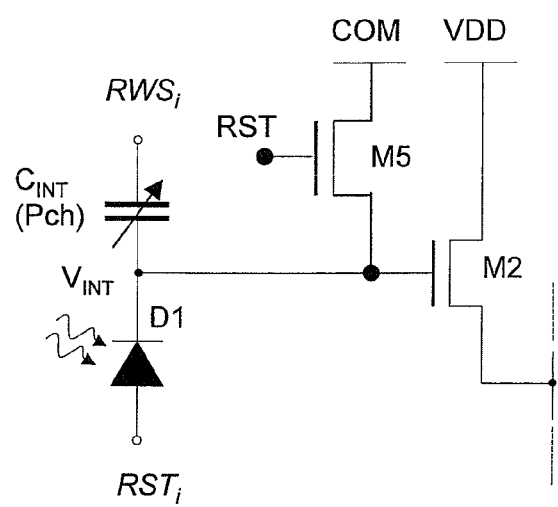
FIG. 57 is an equivalent circuit diagram of the photosensor according to the embodiment.
Figure 58:
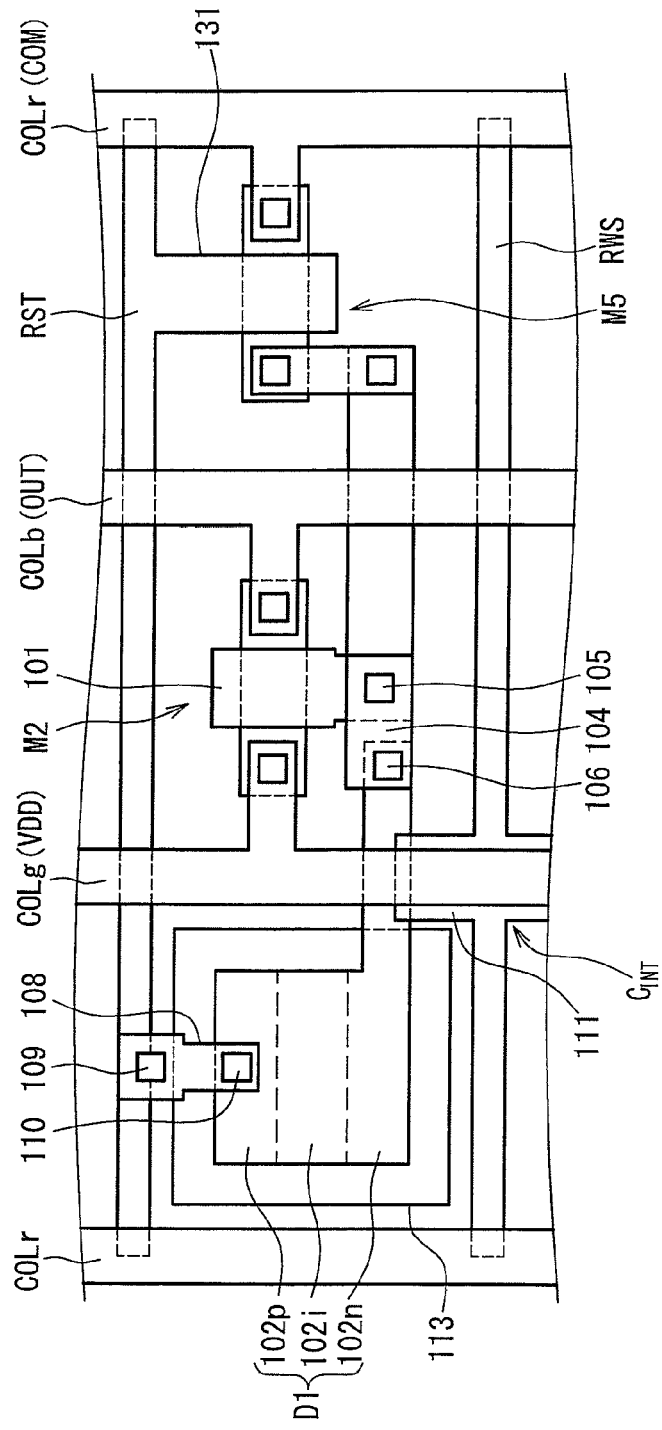
FIG. 58 is a plan view showing an example of a planar structure of the photosensor according to the embodiment.
Figure 59:
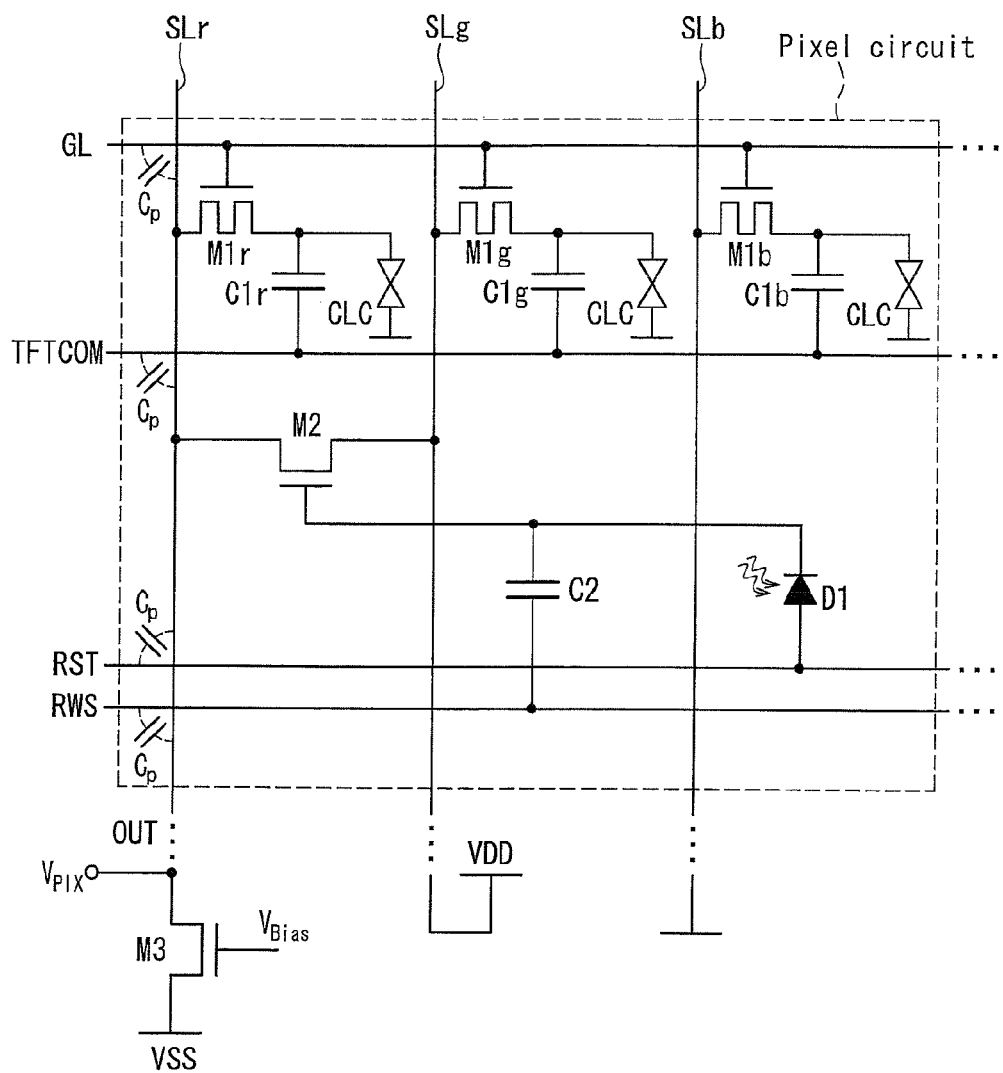
FIG. 59 is an equivalent circuit diagram showing an example of a conventional photosensor formed on an active matrix substrate.

FIG. 57 is an equivalent circuit diagram of the photosensor according to the present embodiment. FIG. 58 is a plan view showing an example of a planar structure of the photosensor according to the present embodiment. As shown in FIGS. 57 and 58, the photosensor of the present embodiment has the configuration of the photosensor of embodiment 1 with an additional thin-film transistor M5 for resetting. The gate electrode 131 of the thin-film transistor M5 for resetting extends out from the wiring RST.

In this configuration as well, the potential of the storage node can be amplified when being read out, similarly to the photosensor of Embodiment 1. This enables realizing a highly sensitive photosensor without deterioration of the S/N ratio.

Also, besides Embodiment 1, the configuration in which the thin-film transistor M5 for resetting is provided in this way can be applied to Embodiment 2, Embodiment 3, Embodiment 4, Embodiment 5, Embodiment 7, and Embodiment 8 as well, thus achieving the effects described in the respective embodiments.

Although the present invention has been described based on Embodiments 1 to 10, the present invention is not limited to the above-described embodiments only, and it is possible to make various changes within the scope of the invention.

For example, an example of a configuration in which the wiring VDD and the wiring OUT that the photosensor is connected to are also used as the source line COL is described in the above embodiments. This configuration has the advantage that the pixel aperture ratio is high. However, since the photosensor wiring is also used as the source line COL in this configuration, it is impossible to read out the sensor circuit output data while the video signal for pixel display is being applied to the source line COL. For this reason, it is necessary to apply the readout signal for the sensor circuit output data in the blanking period as shown in FIG. 11. In view of this, a configuration is possible in which the photosensor wiring VDD and the photosensor wiring OUT are provided separately from the source line COL. This configuration has a lower pixel aperture ratio, but enables the photosensor wiring to be driven independently from the source line COL, and therefore has the advantage of enabling the sensor circuit output data to be read out regardless of the pixel display timing.

Note that as an alternative to the above description, a configuration is possible in which transistors M3, M6, and M7 provided in an IC chip, for example, are used instead of the thin-film transistors M3, M6, and M7 formed on the active matrix substrate.

INDUSTRIAL APPLICABILITY

The present invention is industrially applicable as a display device having a photosensor in a pixel region of an active matrix substrate.

| Reference Signs | |
|---|---|
| 1 | pixel region |
| 2 | display gate driver |
| 3 | display source driver |
| 4 | sensor column driver |
| 41 | sensor pixel readout circuit |
| 42 | sensor column amplifier |
| 43 | sensor column scan circuit |
| 5 | sensor row driver |
| 6 | buffer amplifier |
| 7 | FPC connector |
| 8 | signal processing circuit |
| 9 | FPC |
| 100 | active matrix substrate |

The invention claimed is:
1. A display device comprising a photosensor in a pixel region of an active matrix substrate, the photosensor comprising:
a photodetection element that receives incident light;
reset signal wiring that supplies a reset signal to the photosensor;
readout signal wiring that supplies a readout signal to the photosensor;
a storage node whose potential changes in accordance with the amount of light received by the photodetection element in a sensing period, the sensing period being from when the reset signal is supplied until when the readout signal is supplied;
an amplification element that amplifies the potential of the storage node in accordance with the readout signal; and
a sensor switching element for reading out the potential amplified by the amplification element to output wiring as sensor circuit output,
wherein the amplification element is a diode including a gate electrode over a channel.

2. The display device according to claim 1, comprising a plurality of the photodetection elements in the pixel region,
wherein the plurality of photodetection elements are connected in parallel, and
the amplification element is connected to a terminal photodetection element among the plurality of photodetection elements.

3. The display device according to claim 1,
wherein the sensor switching element is a three-terminal switching element,
a gate electrode among the three terminals is connected to the storage node, and
one of the two remaining terminals among the three terminals is connected to the output wiring.

4. The display device according to claim 1, wherein the amplification element has a threshold voltage at which the amplification element switches on/off, between a low level potential and a high level potential of the readout signal.

5. The display device according to claim 1, further comprising:
a common substrate opposing the active matrix substrate; and
liquid crystal sandwiched between the active matrix substrate and the common substrate.

6. A display device comprising a photosensor in a pixel region of an active matrix substrate,
the photosensor comprising:
a photodetection element that receives incident light;
reset signal wiring that supplies a reset signal to the photosensor;
readout signal wiring that supplies a readout signal to the photosensor;
a storage node whose potential changes in accordance with the amount of light received by the photodetection element in a sensing period, the sensing period being from when the reset signal is supplied until when the readout signal is supplied;
an amplification element that amplifies the potential of the storage node in accordance with the readout signal;
a sensor switching element for reading out the potential amplified by the amplification element to output wiring as sensor circuit output;
a light shielding film provided on a side of the photodetection element that is opposite to a light receiving face thereof; and
an electrode provided opposing the light shielding film so as to form a series capacitor in series with a parasitic capacitance between the light shielding film and the photodetection element,
wherein the electrode is electrically connected to the readout wiring.

7. The display device according to claim 6, comprising a plurality of the photodetection elements in the pixel region,
wherein the plurality of photodetection elements are connected in parallel, and
the amplification element is connected to a terminal photodetection element among the plurality of photodetection elements.

8. The display device according to claim 6,
wherein the sensor switching element is a three-terminal switching element,
a gate electrode among the three terminals is connected to the storage node, and
one of the two remaining terminals among the three terminals is connected to the output wiring.

9. The display device according to claim 6, wherein the amplification element has a threshold voltage at which the amplification element switches on/off, between a low level potential and a high level potential of the readout signal.

10. The display device according to claim 6, further comprising:
a common substrate opposing the active matrix substrate; and
liquid crystal sandwiched between the active matrix substrate and the common substrate.

11. A display device comprising a photosensor in a pixel region of an active matrix substrate,
the photosensor comprising:
a photodetection element that receives incident light;
reset signal wiring that supplies a reset signal to the photosensor;
readout signal wiring that supplies a readout signal to the photosensor;
a storage node whose potential changes in accordance with the amount of light received by the photodetection element in a sensing period, the sensing period being from when the reset signal is supplied until when the readout signal is supplied;
an amplification element that amplifies the potential of the storage node in accordance with the readout signal;
a sensor switching element for reading out the potential amplified by the amplification element to output wiring as sensor circuit output; and
a switching element for resetting the sensor switching element.

12. The display device according to claim 11, wherein the amplification element has a threshold voltage at which the amplification element switches on/off, between a low level potential and a high level potential of the readout signal.

13. The display device according to claim 11, further comprising:
a common substrate opposing the active matrix substrate; and
liquid crystal sandwiched between the active matrix substrate and the common substrate.

* * * * *